United States Patent
Lee et al.

(10) Patent No.: US 8,761,501 B2
(45) Date of Patent: Jun. 24, 2014

(54) METHOD FOR 3D VIDEO CONTENT GENERATION

(75) Inventors: Gwo Giun (Chris) Lee, Tainan (TW); He-Yuan Lin, Tainan (TW); Ming-Jiun Wang, Tainan (TW)

(73) Assignee: National Cheng Kung University, Tainan (TW)

( * ) Notice: Subject to any disclaimer, the term of this patent is extended or adjusted under 35 U.S.C. 154(b) by 148 days.

(21) Appl. No.: 13/456,279

(22) Filed: Apr. 26, 2012

(65) Prior Publication Data

US 2012/0294521 A1    Nov. 22, 2012

Related U.S. Application Data

(60) Provisional application No. 61/478,965, filed on Apr. 26, 2011.

(51) Int. Cl.
*G06K 9/00*    (2006.01)

(52) U.S. Cl.
USPC .......................................... 382/164

(58) Field of Classification Search
CPC ..... G06K 9/00; G06K 9/0067; G06K 9/0061; G06K 9/0063; G06K 9/0071; G06K 9/00718; G06K 9/3241; G06K 9/34; G06K 9/36; G06K 9/46; G06K 9/4604; G06K 9/4609; G06K 9/4614; G06K 9/4647; G06K 9/50; G06K 9/54; G06K 9/62; G06K 9/6212; G06K 9/6215; G06T 7/0079; G06T 7/0081; G06T 7/0083; G06T 7/0097; G06T 7/40; G06T 7/403; G06T 7/408; G06T 11/001; G06T 15/00; G06T 15/04; G06T 2200/00; G06T 2207/10024; H04N 13/00; H04N 13/003; H04N 13/0007; H04N 13/0022; H04N 13/0029; H04N 13/0037; H04N 13/0048; H04N 13/0055; H04N 19/00769

See application file for complete search history.

(56) References Cited

U.S. PATENT DOCUMENTS 8,442,355 B2 *    5/2013    Imai .............................. 382/285

* cited by examiner

*Primary Examiner* — Jose Couso
(74) *Attorney, Agent, or Firm* — Bacon & Thomas, PLLC

(57) ABSTRACT

A method for 3D video content generation is disclosed, capable of transforming a 2D image into a 3D video through proper operation process. The method comprises the following steps of: (A) receiving a 2D image and generating a ROI distribution map from the 2D image; (B) executing a color feature capture process, for forming a plural of color feature regions; (C) executing an image segmentation process basing on the texture feature of the plural of color feature regions, for forming an image region distribution map; (D) executing a depth map generation process, for generating a depth map basing on the ROI distribution map and the image region distribution map; (E) executing a 3D image generation process, for forming the 3D image basing on the image region distribution map and the depth map; and (F) chaining a plurality of the 3D images to form the 3D video basing on a frame rate.

28 Claims, 19 Drawing Sheets

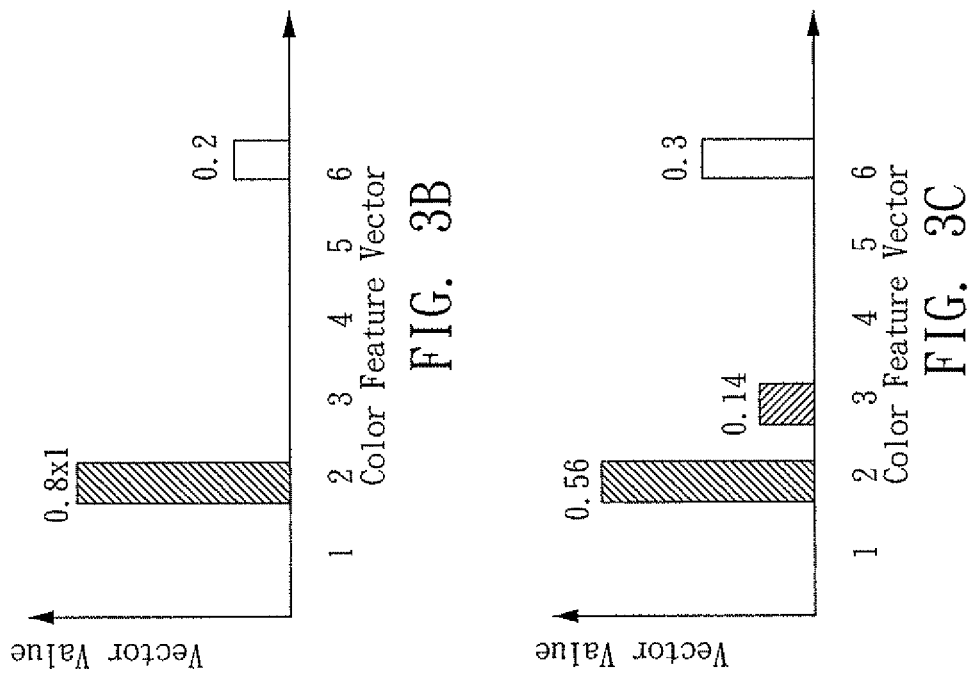
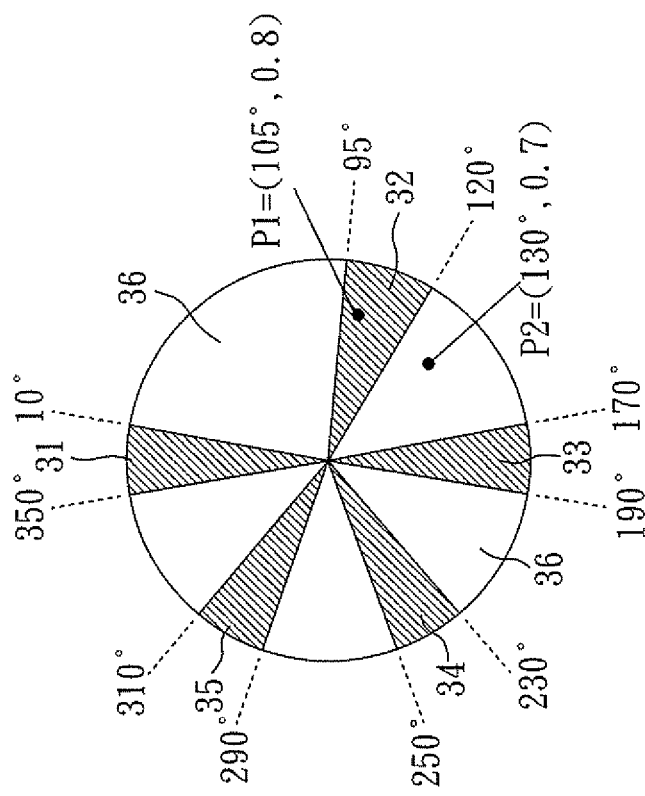
FIG. 3A
FIG. 3B
FIG. 3C

METHOD FOR 3D VIDEO CONTENT GENERATION

CROSS REFERENCE TO RELATED APPLICATION

This application claims the benefit of filing date of U.S. Provisional Application Ser. No. 61/478,965, entitled "Method for Converting from a 2-Dimensional Video to a 3-Dimensional Video" filed Apr. 26, 2011 under 35 USC §119(e)(1).

BACKGROUND OF THE INVENTION

1. Field of the Invention

The present invention relates to a method for generating three-dimensional video content particularly to a method that is capable of receiving a two-dimensional image signal and directing the two-dimensional image signal to undergo a proper calculation algorithm to therefore transform the two-dimensional image signal into a three-dimensional image signal.

2. Description of Related Art

Growing popularity for 3D motion capture filming techniques has set an inspiring tone for the global community. Added interest to this hotly discussed topic for scientific research about conversion from a two-dimensional image to three-dimensional image was sparkled by the release of the 3D film Avatar directed by the legendary film director James Cameron. A great deal of efforts has been invested to pursue and develop a more advanced image conversion technique aiming for converting two-dimensionality to three-dimensionality in image processing. As well known to persons of ordinary skill in the relevant art, the two main and commonly adapted 3D imaging technique may be categorized into two methods: one being a array-based filming technique, the other being a depth-based filming technique.

It is known that array-based filming technique involves setting a number of video cameras in an array arrangement, where its general practice involves using two video cameras. However, these two video cameras should undergo a corrective process before filming starts so as to ensure that there is no horizontal position displacement issue between these two video cameras. Furthermore the distance between these two video cameras should emulate the distance between a normal person's eyes (i.e. the visual parallax of the eyes), so as to simulate a possible perspective of a normal person. In another aspect, the requirement for these two video cameras to be maintained in a synchronous state at a run-time setting incurs extraneous effort and time during use of the equipments. In another aspect, these two video cameras may be subject to changes in light abundance or changes in internal parameters of the video cameras, making the three-dimensional images so captured open to discoloring.

It is also known that depth-based filming technique turns to use one traditional video camera while also coupling with another depth video camera for filming purposes. Generally speaking, the aforementioned depth video camera operates on a "time of flight" principle, working by means of calculating the time period from the emitted infrared light hitting the desired object to the same infrared light returning back into the depth video camera, so as to determine the actual distance between the desired object for phototaking and the video camera. In addition, the relative distance between the aforementioned traditional video camera and the aforementioned depth video camera may be subject to adjustment prior to filming begins so as to ensure that the pixels picked up by the traditional video camera are all well aligned with their corresponding depth value. Unfortunately, the depth resolution offered by the depth video camera still faces serious limitation, and it is not possible to provide a depth image of high image resolution, which altogether creates room for improving the image quality of composite three-dimensional image.

Inasmuch the aforementioned two techniques may already be capable of forming three-dimensional image content, the underlying issue of increased operating cost with these setups remain to be of concern as, for example, the array-based filming technique requires a multiple number of video cameras to be on standby during filming. Taking into another consideration, another disadvantage hereof is that the three-dimensional image produced therefrom will be more open to distortion and become useless if each participating video camera is not adjusted relative to its position from one another or does not synchronize accordingly. Another disadvantage associated with the known setups is of the high price for a depth video camera, which has demonstrated to be a barrier for higher market penetration, making it less possible to effectively lower operating cost for producing a three-dimensional video content with a depth video camera.

Owning to the disadvantage of high filming cost arising from three-dimensional image capturing, effective approach for maintaining quality image while keeping the rate low on producing three-dimensional images has been a popular issue for further research in the industry and academia. Also, two-dimensional image signal is the type of image signal that is most commonly used in the current relevant state of art. It will therefore be understood that the issues encountered by the aforementioned ways for obtaining three-dimensional image content (three-dimensional image signal) will be overcome if a new way for converting two-dimensionality into three-dimensionality is found.

Accordingly, there is a demand in the industrial sectors for a method for receiving a two-dimensional image signal and directing the two-dimensional image signal to undergo a proper calculation algorithm to therefore transform the two-dimensional image signal into a three-dimensional image signal.

SUMMARY OF THE INVENTION

One object of the present invention is to provide a method for generating three-dimensional video content particularly to a method that is capable of receiving a two-dimensional image signal and directing the two-dimensional image signal to undergo a proper calculation algorithm to therefore transform the two-dimensional image signal into a three-dimensional image signal.

According to one aspect of the present invention, there is provided a method for generating a three-dimensional image signal, comprising the following steps: (A) receiving a 2D image and generating a region of interest distribution map from the 2D image, wherein the two-dimensional image signal comprises a plurality of individually colored image pixel, and the region of interest distribution map comprises a region of interest; (B) executing a color feature capture process, for forming a plurality of color feature regions; (C) executing an image segmentation process basing on the texture feature of the plurality of color feature regions, for forming an image region distribution map; (D) executing a depth map generation process, for generating a depth map basing on the region of interest distribution map and the image region distribution map, wherein in the depth map each color texture feature region is individually characterized by a depth value; (E)

executing a 3D image generation process, for forming the 3D image basing on the image region distribution map and the depth map; and (F) chaining a plurality of the 3D images to form the 3D video basing on a frame rate.

It is therefore apparent through a three-dimensional image content generation method disclosed by the present invention to receive a two-dimensional image signal and direct the two-dimensional image signal to undergo a proper calculation algorithm to therefore transform the two-dimensional image signal into a three-dimensional image signal.

BRIEF DESCRIPTION OF THE DRAWINGS

FIG. 3A is a schematic view illustrating the process of respectively mapping the colors of two image pixels contained in a two-dimensional image signal to a color plane of an HSI color space, for respectively clustering the colors of the two image pixels into a color region or a fuzzy region;

FIG. 3B is a graph showing the result from the clustering as illustrated in FIG. 3A according to the present invention with respect to the process of designating the first image pixel with a color feature vector;

FIG. 3C is a graph showing the result from the clustering as illustrated in FIG. 3A according to the present invention with respect to the process of designating the second image pixel with a color feature vector;

NUMERAL REFERENCES

Figure 1:
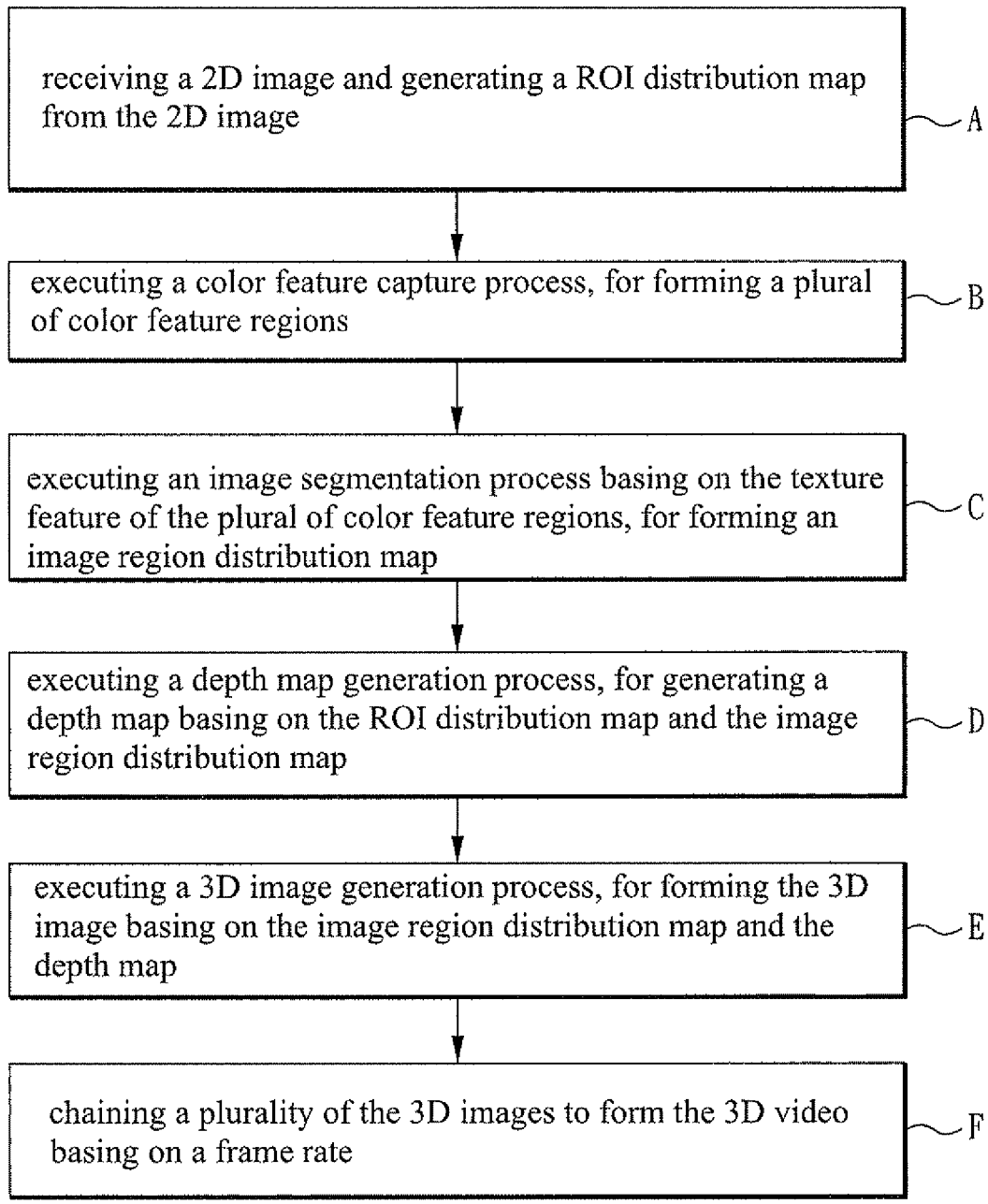
FIG. 1 illustrates a flow chart of steps during operation of the three-dimensional image content generation method according to an embodiment of the present invention.

31 Red color region
32 Green color region
33 Cyan color region
34 Blue color region
35 Red-violet color region
51 Internal subband Gabor filter
52 External subband Gabor filter
91, 101 First color texture feature region
92, 102 Second color texture feature region
93, 103 Third color texture feature region
94, 104 Fourth color texture feature region
95, 105 Fifth color texture feature region
97 Region of interest
106 Color texture feature region
107 70% area coverage of color texture feature region

DETAILED DESCRIPTION OF THE PREFERRED EMBODIMENT

The invention is capable of other embodiments and of being practiced or carried out in various ways. Variations and modifications of the foregoing are within the scope of the present invention. It will also be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

FIG. 1 shows a flow chart of steps during operation of the three-dimensional image content generation method according to an embodiment of the present invention. An advantage of the three-dimensional image content generation method may be for transforming a two-dimensional image signal into a three-dimensional image signal. As shown in FIG. 1, the method for generating a three-dimensional image content comprises the following steps:

(A) receiving a 2D image and generating a ROI distribution map from the 2D image;

(B) executing a color feature capture process, for forming a plural of color feature regions;

(C) executing an image segmentation process basing on the texture feature of the plural of color feature regions, for forming an image region distribution map;

(D) executing a depth map generation process, for generating a depth map basing on the ROI distribution map and the image region distribution map;

(E) executing a 3D image generation process, for forming the 3D image basing on the image region distribution map and the depth map; and (F) chaining a plurality of the 3D images to form the 3D video basing on a frame rate.

Figure 2:
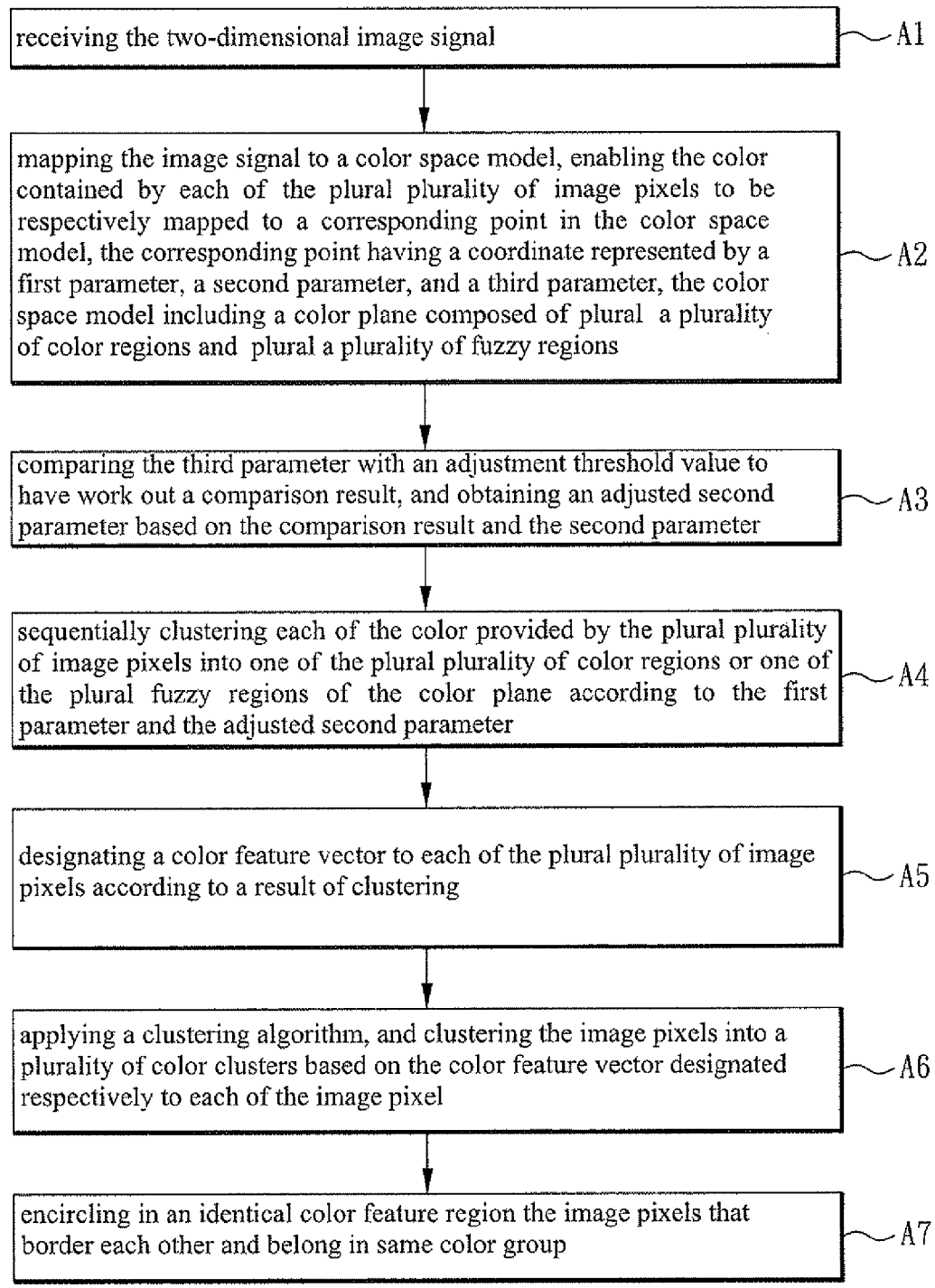
FIG. 2 illustrates a flow chart of steps during operation of the color capture process of the three-dimensional image content generation method according to an embodiment of the present invention.

Step (B) of the three-dimensional image content generation method of the present invention may be referred to FIG. 2, which is directed to a flow chart of steps during operation of the color capture process of the three-dimensional image content generation method according to an embodiment of the present invention, wherein the steps of which comprise the following:

(A1) receiving the two-dimensional image signal;

(A2) mapping the image signal to a color space model, enabling the color contained by each of the plurality of image pixels to be respectively mapped to a corresponding point in the color space model, the corresponding point having a coordinate represented by a first parameter, a second parameter, and a third parameter, the color space model including a color plane composed of a plurality of color regions and a plurality of fuzzy regions;

(A3) comparing the third parameter with an adjustment threshold value to work out a comparison result, and obtaining an adjusted second parameter based on the comparison result and the second parameter;

(A4) sequentially clustering each of the color provided by the plurality of image pixels into one of the plurality of color regions or one of the plural fuzzy regions of the color plane according to the first parameter and the adjusted second parameter;

(A5) designating a color feature vector to each of the plurality of image pixels according to a result of clustering;

(A6) applying a clustering algorithm, and clustering the image pixels into a plurality of color clusters based on the color feature vector designated respectively to each of the image pixel;

(A7) encircling in an identical color feature region the image pixels that border each other and belong in same color group.

In step (A1) of the abovementioned method, one two-dimensional image signal includes a plurality of image pixels, and these image pixels each contains a color. In addition, the two-dimensional image signal format is unlimited, which may be YcbCr420 or RGB444. Next, in step (A2), the image signal is mapped to a color space model, making the colors contained by each image pixels projected individually to a pair of corresponding points in the color space model, and the coordination for the corresponding point is composed of a first parameter value, a second parameter value, and a third parameter value. In the present embodiment, the color space model may be of any desirable type, which may be a HSI color space model, a RGB color space model, a YUV color space model or a CMY color space model.

Referring now to FIG. 3A, a schematic view is provided illustrating the process of respectively mapping the colors of two image pixels contained in a two-dimensional image signal to a color plane of an HSI color space, for respectively clustering the colors of the two image pixels into a color region or a fuzzy region.

As shown in FIG. 3A, the aforementioned color feature capture process works to divide a color plane of the HIS color space model into five color regions, each representing a first color region, a second color region, a third color region, a fourth color region and a fifth color region, wherein each color region individually responds to a particular color. In the present embodiment, the first color region corresponds to a red region 31 (red), the second color region corresponds to a green region 32 (green), the third color segment corresponds to a cyan region 33 (cyan), the fourth color region corresponds to a blue region 34 (blue), and the fifth color segment corresponds to a magenta region 35 (magenta).

In addition, as can be seen on the color plane of FIG. 3A, the contained angle in red region 31 is between 350° to 410°, the contained angle in green region 32 is between 95° to 120°, the contained angle in cyan region 33 between 170° to 190°, the contained angle in blue region 34 is between 230° to 250°, the contained angle in magenta region 35 is between 290° to 310°. It is to noted here that the aforementioned contained angles all can not only include the above five angle ranges, but also be adjusted with respect to actual demand accordingly. Furthermore, a fuzzy region is defined as a space located between two neighboring color regions (those not covered by the five color regions as mentioned above). For example, a region located between a first color region and a second color region, or a region located between a third color region and a fourth color region. Therefore, as shown by FIG. 3A, the color plane has five color regions and five fuzzy regions.

In the present embodiment, the two image pixels contained by the aforementioned image signal is each a first image pixel and a second image pixel, and these two image pixels each has a color, as previously recited by step (A1), the color feature capture process.

In another embodiment of the present invention, as described by step (A2) for color feature capture process, the aforementioned image signal is mapped to a HSI color space model, making the colors contained by first image pixel and second image pixel mapped to a corresponding point in the HSI color space model. In the present case, the corresponding point P1 for the color of the first image pixel in the HSI color space model is (105°, 0.75, 90), the corresponding point P2 for the color of the second image pixel in the HSI color space model is (130°, 0.625, 85), wherein the first parameter is for a hue value, the second parameter is a saturation value, the third parameter is an intensity value.

As described by step (A3) for color feature capture process, the next step is to compare the third parameter value of the corresponding point P1 and P2, which is the intensity value, with an adjustment threshold value, and then work out an adjusted second parameter value based on a result of the comparison and their respective second parameter value, which is again, saturation value. In a preferred embodiment of the present invention, an adjusted threshold value is between 70 and 90, in an even more preferred embodiment, the value is between 80 and 87. In the current embodiment, the aforementioned adjusted threshold value is 85. When the intensity value of either of the corresponding point P1 or corresponding point P2 is higher than the aforementioned adjusted threshold value, the following formula will be used to calculate the adjusted saturation component:

$$S' = a + b*S \quad \text{(Formula 1)}$$

wherein S' is an adjusted saturation component, S is a saturation component, a and b are each a random positive number, and satisfy the a+b=1 condition. In the present example, the abovementioned formula can further modified as:

$$S' = 0.2 + 0.8*S \quad \text{(Formula 2)}$$

wherein a=0.2, b=0.8. However, the values of a and b may change for other embodiments; for example, a=0.3, b=0.7.

In another situation, when the intensity value of either of the corresponding point P1 or corresponding point P2 is not higher than the aforementioned adjusted threshold value, the following formula will be used to calculate the adjusted saturation component:

$$S' = (a + b*S) * \left(\frac{I}{T}\right) \quad \text{(Formula 3)}$$

wherein S' is an adjusted saturation value, S is saturation value, T is the adjusted threshold value, a and b is each a random positive number, and satisfy the a+b=1 condition. In the present example, the abovementioned formula can be further modified as:

$$S' = (0.2 + 0.8*S) * \left(\frac{I}{85}\right) \quad \text{(Formula 4)}$$

wherein a=0.2, b=0.8. However, the values of a and b may change for other embodiments; for example, a=0.3, b=0.7. Similarly, although the adjusted threshold value T is 85, the adjusted threshold value T may also be other values, such as 90 or 80.

As described above, in the present example, the corresponding point P1 for the color of the first image pixel in the HSI color space model is (105°, 0.75, 90), and the corresponding point P2 for the color of the second image pixel in the HSI color space model is (130°, 0.625, 85). In this case, since the intensity value (90) of P1 is higher than the adjusted threshold value (85), the adjusted saturation value will work out to be 0.8 as calculated by the aforementioned formula 2. As a result, the coordination of P1 in FIG. 3A on a color plane is (105°, 0.8). In another situation, since the intensity value (85) of P2 is not higher than the aforementioned adjusted threshold value (85), the adjusted saturation value will work out to be 0.8 as calculated by the aforementioned formula 4. As a result, the coordination of P2 in FIG. 2A on a color plane is (130°, 0.7).

In step (A4) of the aforementioned color feature capture process, the colors contained by two image pixels are categorized into one of the five color regions or one of the five fuzzy regions of a color plane as shown in FIG. 3A, wherein the two image pixels are determined from the first parameter and the adjusted second parameter of the corresponding point P1 and P2 respectively, which in other terms may be referred to as the hue value and the adjusted saturation value.

Referring now to FIG. 3A, the corresponding point P1 is located at (105°, 0.8), and can be categorized into the green region 32, and because the corresponding point P2 is located at (130°, 0.7), it is categorized into the fuzzy region 36 between the green region 32 and cyan region 33.

Next following the color feature capture process as described by step (A5) of the above, a color feature vector is designated to each of these image pixels according to a result of the abovementioned categorization. When the color of the image pixel is classified into one of the five color regions, the color feature vectors designated to the image pixel include a first vector, a second vector, a third vector, a fourth vector, a fifth vector, and a sixth vector. Furthermore, in the present embodiment the first vector responds to a red region 31, the second vector responds to a green region 32, the third vector responds to a cyan region 33, the fourth vector responds to a blue region 34, the fifth vector responds to a magenta region 35, and the sixth vector responds to an achromatic region.

In addition, the value of the sixth component is equal to 1 subtracting adjusted saturation value (i.e. 1-S'), while also the sum of the values for the first vector, second vector, third vector, fourth vector, fifth vector, and sixth vector is 1. In the present example, only the component of which the color of the corresponding image pixel is categorized to the color region (i.e. the second vector), and the sixth vector are of non-zero values, and the sum of the two values is 1. In the situation just described, only the vector of which the color of the corresponding image pixel is categorized to the color region (i.e. the second component), and the sixth vector are of non-zero values, and the sum of the two values is 1.

Generally speaking, the achromatic color feature relates to the amount of white light component within a color of an image pixel. The amount of such component can enable a viewer see the difference between a color's saturation level. More specifically, human perception to an image pixel may differ significantly if the colors of which share the same hue but different level of saturation. For example, the hue components of bright red or dark red may be very similar, but differ significantly with respect to saturation; this is because the white light components differ by a significant degree, which therefore has stimulated various sources defining achromatic color feature as for aiding in capturing features having improved color properties.

However, when the color of an image pixel is not categorized into the aforementioned five color regions, for example being categorized into one of the five fuzzy regions, the color feature vectors designated to the image pixel will include a first vector, a second vector, a third vector, a fourth vector, a fifth vector, and a sixth vector. To recite from before, the value of the sixth vector is equal to 1 minus the adjusted saturation component, and its mathematical representation may be 1-S'. Moreover, the sum of the values for the first vector, second vector, third vector, fourth vector, fifth vector, and the sixth vector is 1. In the present example, only two vectors that respectively correspond to the color regions on the two sides of the aforementioned fuzzy region (i.e. the second vector and the third vector), and the sixth vector are of non-zero values, and the sum of the three values is 1.

Since the corresponding point P1 is categorized into the green region 32, it will be understood that only the second vector and the sixth vector corresponding to the green region 32 show non-zero values, as shown in FIG. 3B. Even more, since the adjusted saturation value for P1 is 0.8, the second vector corresponding to the green region 32 in the aforementioned color feature vector is 0.8, and the value of the sixth vector is 0.8 (since 1−0.8=0.2). Accordingly, it will be understood to designate a color feature vector, represented by V1(0, 0.8,0,0,0,0.2).

In another perspective of the invention, since P2 is categorized into the fuzzy region 36 between the green region 32 and cyan region 33, it will also be understood that only the second vector corresponding to the green region 32, the third vector corresponding to the cyan region 33, and the sixth vector will show non-zero values. In addition to this, if the color contained by the image pixel is not categorized into one of the aforementioned five color regions, and P2 is categorized into a fuzzy region between a green region 32 and a cyan region 33, the value of the second vector may be calculated using the following formula:

$$C = S'^* \text{Belongingness} \quad \text{(Formula 5)}$$

where C is a value of the second vector, S' is the adjusted saturation component, Belongingness is a degree of belongingness, and the degree of belongingness may be determined by:

$$\text{Belongingness} = \frac{U - H}{U - L} \quad \text{(Formula 6)}$$

where U is an angle contained by a distant border of a color region on the color plane, to which the second vector corresponds, L is an angle contained between a neighboring border of a color region on the color plane, to which the second vector corresponds, H is an angle contained between the hue component and the color plane.

Taking P2 as an example, since P2 is categorized into a fuzzy region between a green region 32 and a cyan region 33, it is required to individually determine the fuzzy region's belongingness with respect to its two neighboring color regions (green region 32 and cyan region 33). The first step relates to the green region 32, and because P2 is located at (130°, 0.7), the angle that its hue component contains on the color plane is 130°. Next, the fuzzy region has two borders, and one distant border of the green region 32 on the color plane (L) is 120°. Therefore, the fuzzy region's belongingness to the green region 32 is:

$$\text{Belongingness} = \frac{170 - 130}{170 - 120} = 0.8 \quad \text{(Formula 7)}$$

Therefore, given that the adjusted saturation component is 0.7, couple with the aforementioned formula 5, it can be determined that the vector quantity corresponding to green region 32 is 0.7*0.8 0.56, as shown in FIG. 3C.

By the same principle using the same definitions, the required parameters for calculating P2's belongingness with respect to the cyan region 33 will be: an angle contained by one distant border of the cyan region 33 on the color plane (U) is 120°, and one angle contained by one neighboring border of the cyan region 33 on the color plane (L) is 170°.

Accordingly, the belongingness of P2 with respect to the cyan region 33 may be calculated as follows:

$$\text{Belongingness} = \frac{120 - 130}{120 - 170} = 0.2 \quad \text{(Formula 8)}$$

Therefore, since the adjusted saturation component of P2 is 0.7, and in conjunction with the aforementioned formula 5, it may be determined that the vector quantity of the cyan region 33 is 0.7*0.2=0.14, as shown in FIG. 3C. Also since the adjusted saturation component is 0.7, the sixth component is 0.3 (1−0.7=0.3). Then, it will be understood that an image pixel's color may be used to designate an image pixel's color feature vector V2(0,0.56, 0.14, 0, 0, 0.3).

Subsequently in step (A6) of the above process, a clustering algorithm is used to cluster image pixels into clusters based on the designated color feature vector of the image pixel. In general, the cluster algorithm herein may be K-means cluster algorithm methodology, CRLA (constraint run length algorithm) cluster algorithm methodology, SBKM (symmetry distance based K-means algorithm) cluster algorithm methodology, etc., but the preferred methodology is K-means cluster algorithm.

Lastly, the color feature capture process of step (B) of the three-dimensional image content generation method of the present invention is capable of precisely capturing a color feature vector from the colors of a two-dimensional image signal having a plurality of image pixels, such as V1(0,0.8,0, 0,0,0.2) and V2(0,0.56,0.14,0,0,0.3), and then designating these two color feature vectors to their corresponding image pixels. Next, by putting into application of a cluster algorithm, the image pixels of a two-dimensional image signal can be categorized into a plurality of color clusters based on the color feature vector designated to each image pixel. Finally, a plurality of neighboring and being-of-same-color-cluster image pixels are included in the same color feature region, thereby making it possible to form a plurality of color feature regions.

Figure 4:
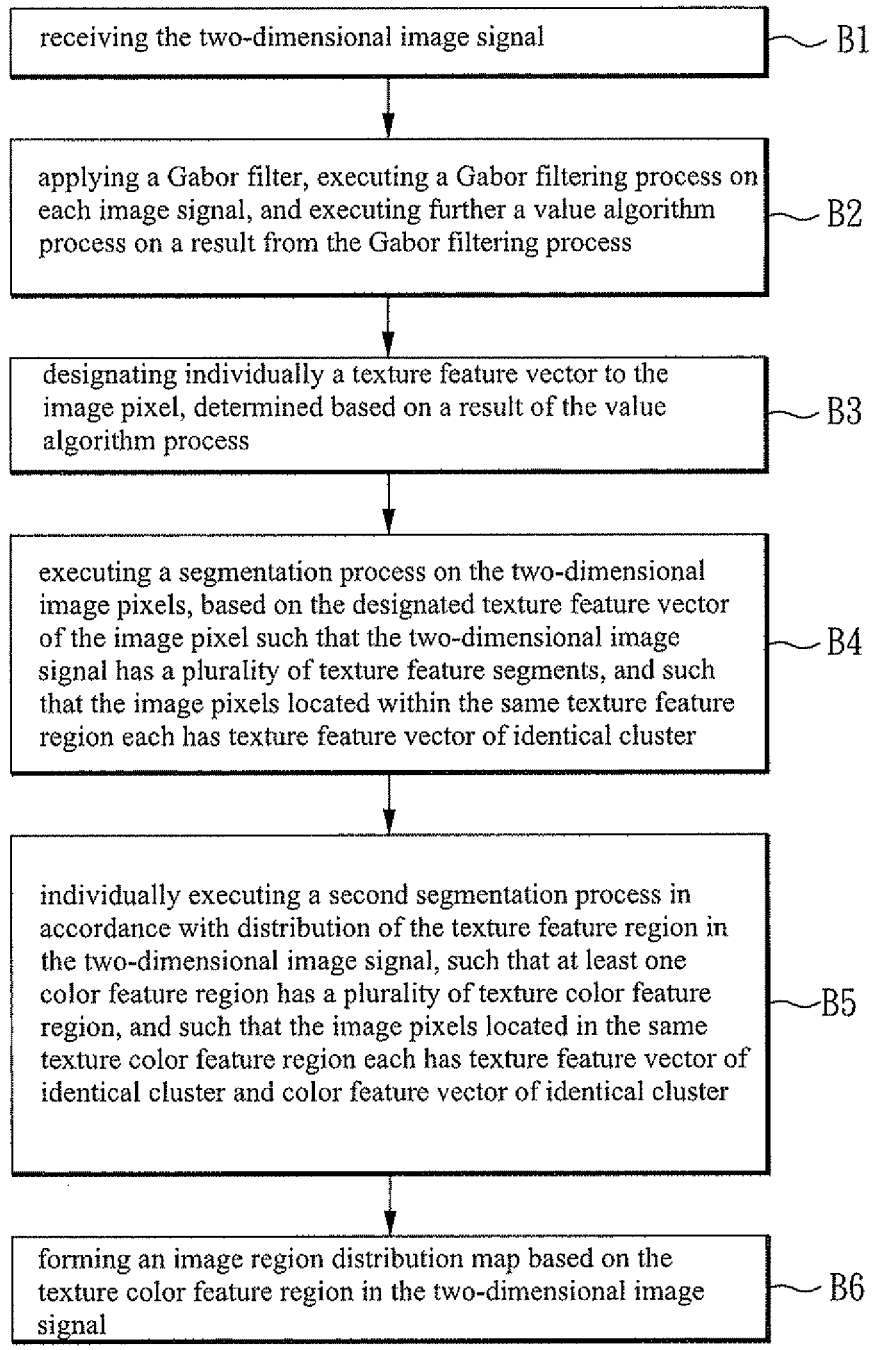
FIG. 4 illustrates a flowchart of steps during operation of an image segmentation process using texture feature of the three-dimensional image content generation method, according to an embodiment of the present invention.

Next, please refer to FIG. 4 for the step (C) for an image segmentation process using texture feature of the three-dimensional image content generation method, according to an embodiment of the present invention. FIG. 4 illustrates a flowchart of steps during operation of an image segmentation process using texture feature of the three-dimensional image content generation method, according to an embodiment of the present invention, wherefore the process includes the following steps:

(B1) receiving the two-dimensional image signal;

(B2) applying a Gabor filter, executing a Gabor filtering process on each image signal, and executing further a value algorithm process on a result from the Gabor filtering process;

(B3) designating individually a texture feature vector to the image pixel, determined based on a result of the value algorithm process;

(B4) executing a segmentation process on the two-dimensional image pixels, based on the designated texture feature vector of the image pixel such that the two-dimensional image signal has a plurality of texture feature segments, and such that the image pixels located within the same texture feature region each has texture feature vector of identical cluster;

(B5) individually executing a second segmentation process in accordance with distribution of the texture feature region in the two-dimensional image signal, such that at least one color feature region has a plurality of texture color feature region, and such that the image pixels located in the same texture color feature region each has texture feature vector of identical cluster and color feature vector of identical cluster; and (B6) forming an image region distribution map based on the texture color feature region in the two-dimensional image signal.

Firstly, as per step (B1), the two-dimensional image signal comprises a plurality of image pixels. There is no limitation on the choice of format for the two-dimensional image signal, and such lack of limitation allows a two-dimensional image signal represented by any format to be used in the image segmentation process using texture feature.

Figure 5:
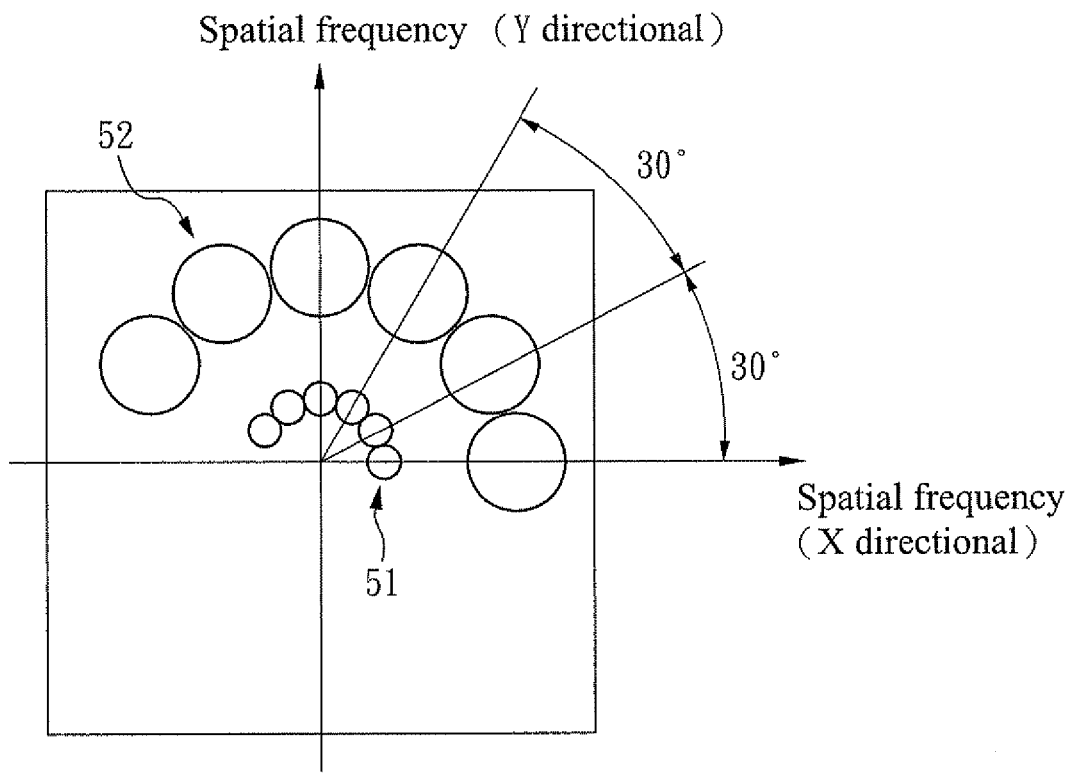
FIG. 5 is a diagram illustrating the disposition of twelve two-dimensional Gabor filters included in a Gabor filter package on a spatial plane, operational in the image segmentation process using texture feature of the three-dimensional image content generation method, according to an embodiment of the present invention.

Next, in step (B2), a Gabor filter is installed with the two-dimensional image signal to implement a Gabor filtering process to each image pixel, and subsequently execute a value algorithm process with respect to the output from the execution of the Gabor filtering process. In further illustration, such value algorithm process is for calculating the modulation magnitude outputted from the Gabor filtering process. In addition in the present example, the Gabor filter package includes an internal subband Gabor filter 51 and an external subband Gabor filter 52, and the internal subband Gabor filter 51 and external subband Gabor filter 52 each includes six two-dimensional Gabor filters, meaning that each of the internal subband Gabor filter 51 and the external subband Gabor filter 52 has an identical number of two-dimensional Gabor filters. A schematic view of the distribution of the twelve two-dimensional Gabor filters on the space plane is illustrated in FIG. 5.

Furthermore, the twelve two-dimensional Gabor filters can each be described by the following formula:

$$g(x, y; \sigma_x, \sigma_y, \omega, \theta) = \frac{1}{2\pi\sigma_x\sigma_y} e^{-\frac{1}{2}\left(\left(\frac{x'}{\sigma_x}\right)^2 + \left(\frac{y'}{\sigma_y}\right)^2\right)} e^{j\omega x'} \quad \text{(Formula 9)}$$

where each $\sigma_x$, $\sigma_y$ each is a Gaussian kernel standard deviation, $\omega$ is a Fourier fundamental frequency, $\theta$ is a direction of the two-dimensional Gabor filter. Also, the relationship between x', y', x', y satisfy the following formulas:

$$x'=x \cos \theta + y \sin \theta \quad \text{(Formula 10)}$$

$$y'=x \sin \theta + y \cos \theta \quad \text{(Formula 11)}$$

In the present example, the standard deviations for the six two-dimensional Gabor filters of the internal subband Gabor filter 51, $\sigma_x$, $\sigma_y$ are preferred to be configured at between 1.75 and 6.5, and the standard deviations for the six two-dimensional Gabor filters of the internal subband Gabor filter 51, $\sigma_x$, $\sigma_y$ are preferred to be configured at between 1.75 and 4.5. In addition, the Fourier fundamental frequency $\omega$ is preferred to be configured at between $0.2\pi$ and $0.6\pi$.

The next step (B3) involves individually designating each of the image pixel of the two-dimensional image signal a texture feature vector in accordance with the output (modulation magnitude) obtained from executing the aforementioned value algorithm process. The number of dimensions of these texture feature vectors is equal to the number of the two-dimensional Gabor filters used in the Gabor filtering process in step (B2).

In step (B4), a segmentation process is implemented on the two-dimensional image signal according to the texture feature vector designated to each image pixel, such that the two-dimensional image signal has a plurality of texture feature regions. Additionally, the plurality of image pixels in the same texture feature region each has a texture feature vector of identical cluster. Because of this, the two-dimensional image signals that are results of a segmentation process are segmented into a plurality of texture color feature region, and these texture color feature regions can be distributed to any location within the entire area realized contained in the two-dimensional image signal. The segmentation process in the present embodiment uses a K-means cluster algorithm. Since K-means cluster algorithm is widely used in numerous fields of technology and is commonly known by people skilled in the relevant art, an elaboration of the K-means cluster algorithm is omitted.

Step (B5) involves individually executing a second segmentation process in accordance with distribution of the texture feature region in the two-dimensional image signal, such as their relative positions in the two-dimensional image signal, such that at least one color feature region has a plurality of texture color feature region. The second segmentation process herein involves the following steps:

Comparing with each other the value of the area of the color feature region and the value of the second segmentation process; and When the area of one of the color feature region is higher in value than the threshold value after second segmentation process, performing a third segmentation process on the color feature region to achieve the texture color feature region by following the distribution of texture feature regions in the two-dimensional image signal.

Figure 6A:
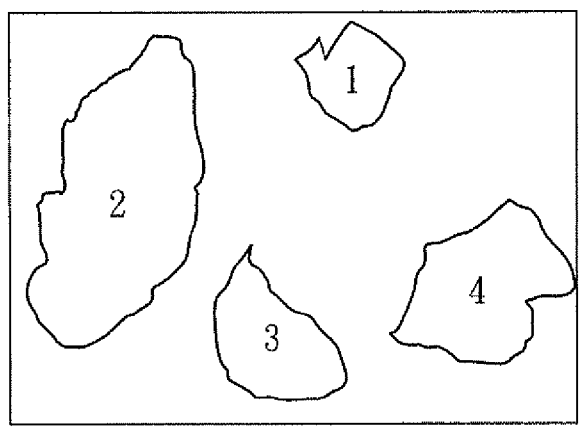
FIG. 6A shows a distribution diagram for a plurality of color feature regions represented in a two-dimensional image signal.
Figure 6B:
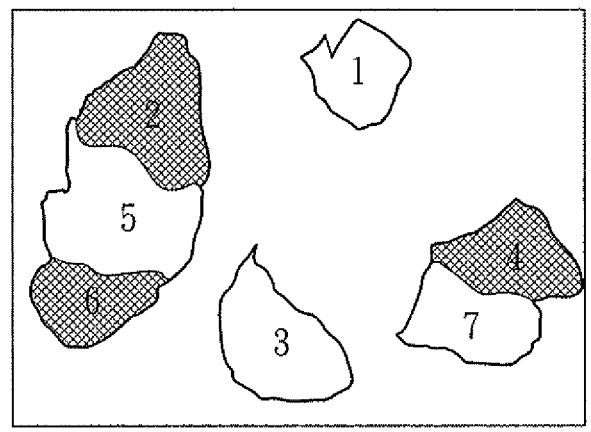
FIG. 6B shows a distribution diagram for a plurality of color feature regions of FIG. 6A as further segmentized after a re-segmentation process.

Referring now to FIGS. 6A and 6B for the result of the aforementioned second segmentation process, FIG. 6A shows the distribution of a plurality of color feature regions in a two-dimensional image signal, and FIG. 6B shows a resulting situation after a second segmentation process is finished, wherein the color feature region of FIG. 6A is further segmented into a plurality of texture color feature regions.

Lastly, step (B6) involves forming an image region distribution map obtained from step (C) of an embodiment of the three-dimensional image content generation method of the present invention, based on the texture color feature region in the two-dimensional image signal.

The image segmentation process using texture feature of the three-dimensional image content generation method of an embodiment of the present invention has been described therefrom. Nevertheless, after the image segmentation process of step (C) is finished, step (C) can further include a step of executing an image region combination process subject to actual requirement, such that a plurality of texture color feature region is combined into a combined image texture color feature region.

Figure 7A:
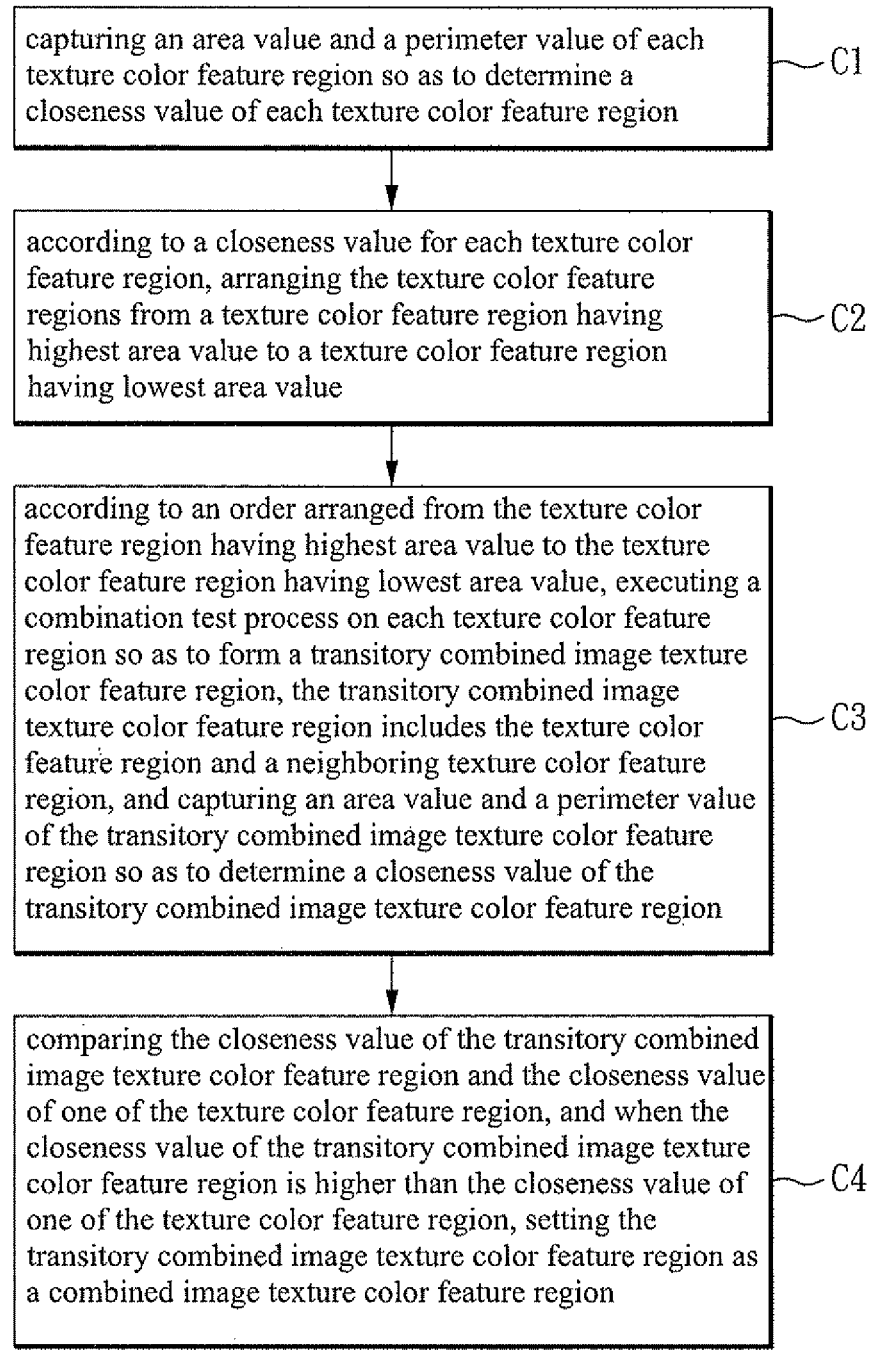
FIG. 7A illustrates a flow chart of steps during operation of an image segment merging process according to an embodiment of the present invention.

Please refer to FIG. 7A for details on the image region combination process. Of which, FIG. 7A is directed to an image region combination process of an embodiment of a three-dimensional image content generation method, and the image region combination method includes the following steps:

(C1) capturing an area value and a perimeter value of each texture color feature region so as to determine a closeness value of each texture color feature region;

(C2) according to a closeness value for each texture color feature region, arranging the texture color feature regions from a texture color feature region having highest area value to a texture color feature region having lowest area value;

(C3) according to an order arranged from the texture color feature region having highest area value to the texture color feature region having lowest area value, executing a combination test process on each texture color feature region so as to form a transitory combined image texture color feature region, the transitory combined image texture color feature region includes the texture color feature region and a neighboring texture color feature region, and capturing an area value and a perimeter value of the transitory combined image texture color feature region so as to determine a closeness value of the transitory combined image texture color feature region; and (C4) comparing the closeness value of the transitory combined image texture color feature region and the closeness value of one of the texture color feature region, and when the closeness value of the transitory combined image texture color feature region is higher than the closeness value of one of the texture color feature region, setting the transitory combined image texture color feature region as a combined image texture color feature region.

Figure 7B:
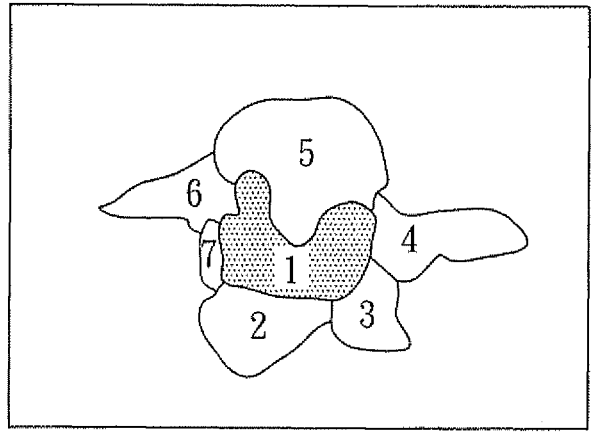
FIG. 7B is a distribution diagram for a plurality of texture color feature regions represented in a two-dimensional image signal.
Figure 7C:
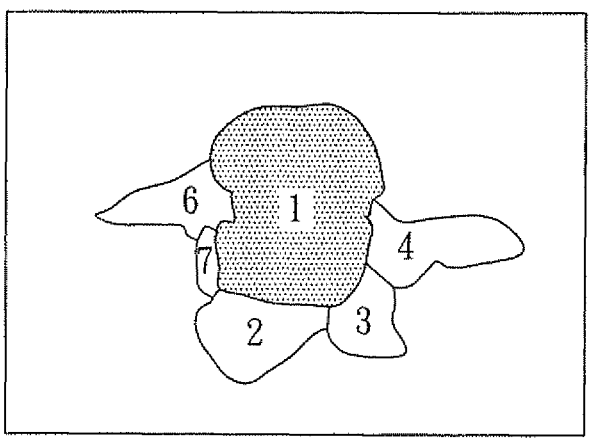
FIG. 7C is an illustrative diagram demonstrating the result of merging a texture color feature regions of tag number 1 and a texture color feature regions of tag number 5 for deriving a transitorily merged texture color feature regions.

Heretofore, FIG. 7B and FIG. 7C are referred for detailing the aforementioned combination test process. As will be seen, FIG. 7B displays the way a plurality of texture color feature region is disposed in a two-dimensional image signal, and FIG. 7C illustrates combination of a texture color feature region labeled as 1 and another texture color feature region labeled as 5 to give rise to a transitory combined image texture color feature region.

Continuing from the above, the closeness value of a plurality of texture color feature region can be determined using the following formula:

$$C = \frac{A}{P^2} \quad \text{(Formula 12)}$$

where C is closeness value, A is area value, P is perimeter value. Accordingly, the closeness value of each texture color feature region can be determined.

Next, in the aforementioned image region combination method, according to the order just described (arranging the texture color feature regions from a texture color feature region having highest area value to a texture color feature region having lowest area value), execute a combination test process on each texture color feature region so as to form a transitory combined image texture color feature region, wherein the transitory combined image texture color feature region includes one of the texture color feature regions and another, neighboring texture color feature region. Afterwards, the area value and perimeter value of the transitory combined texture color feature region are determined and ultimately the closeness value is determined accordingly.

In the present example, the aforementioned combined test process is executed starting with the texture color feature region labeled as 1. As shown in FIG. 7B, such arrangement begins with the plurality of texture color feature regions neighboring the texture color feature region labeled as 1, for example, combining the texture color feature region labeled as 1 and the texture color feature region labeled as 5 into a transitory combined image texture color feature region, then, combining the texture color feature region labeled as 1 and the texture color feature region labeled as 4 into another transitory combined image texture color feature region, and the above process continues on further.

However in some applications, a threshold value identification process will be executed before the aforementioned "combination test process" is executed, meaning that the area value and closeness value of each of the texture color feature region are compared respectively with an area threshold value and a closeness threshold value. Also, the aforementioned combination test process is only executed when the area value of texture color feature region resulting from the comparison is lower than the aforementioned area threshold value, and when the closeness value of the texture color feature region is lower than the closeness value of the aforementioned threshold value. In the present embodiment, the area threshold value is between 120 to 240, wherein the preferred embodiment is 180; the closeness threshold value is between 0.001 to 0.008, wherein the preferred embodiment is 0.003, depending on the environmental conditions.

Then as shown in FIG. 7C, the texture color feature region labeled as 1 and the texture color feature region labeled as 5 are combined into a transitory combined image texture color feature region, then the area value and perimeter value of the transitory combined image texture color feature region obtained the combination of the texture color feature regions labeled as 1 and 5 can be determined. Accordingly, the closeness value of the transitory combined image texture color feature region can be determined.

The closeness value of the transitory combined image texture color feature region and the closeness value of the transitory combined image texture color feature region labeled as 1 are compared. When the closeness value of the transitory combined image texture color feature region is higher than the closeness value of the texture color feature region labeled as 1, the transitory combined image texture color feature region is set as the combined image texture color feature region. On the contrary, when the closeness of the texture color feature region is not higher than the closeness value of the texture color feature region labeled as 1, the aforementioned process is repeated. An instance illustrating this embodiment is to combine the texture color feature region labeled as 1 and the texture color feature region labeled as 4 to form a transitory combined image texture color feature region, and then capture the area value and perimeter value of another transitory combined image texture color feature region to further determine the closeness value of this transitory combined image texture color feature region.

When the aforementioned combination test procedure is executed on all the texture color feature regions neighboring the texture color feature region labeled as 1, the previously mentioned ordering method (arranging the texture color feature regions from a texture color feature region having highest area value to a texture color feature region having lowest area value) is replaced with designating the texture color feature region of second largest area value to be the standard texture color feature region for performing the combination test procedure.

Lastly, when the aforementioned combination test process is executed on all the texture color feature regions (for combining the standard texture color feature region for combination test process), the previously described image region combination process is complete, meaning that for the above two-dimensional image signal, all of the texture color feature regions satisfying the combination conditions of texture color feature region are combined according to the relative relationship there between to form a plurality of combined image texture color feature regions.

Figure 8:
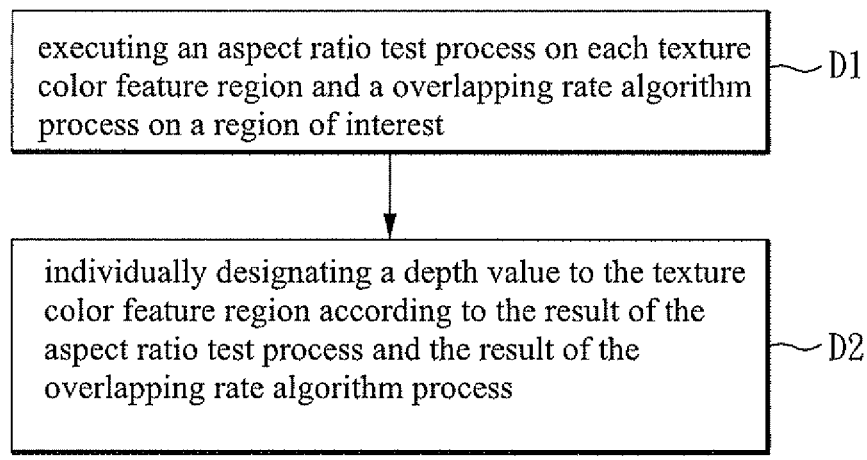
FIG. 8 illustrates a flow chart of steps during operation of a depth map generation process of the three-dimensional image content generation method according to an embodiment of the present invention.

As per the depth map generation process of step (D) of the three-dimensional image content generation method of the present invention, please refer to FIG. 8, wherein FIG. 8 relates to a flow chart of steps during operation of a depth map generation process of the three-dimensional image content generation method according to an embodiment of the present invention:

(D1) executing an aspect ratio test process on each texture color feature region and a overlapping rate algorithm process on a region of interest; and (D2) individually designating a depth value to the texture color feature region according to the result of the aspect ratio test process and the result of the overlapping rate algorithm process.

Wherein, the aforementioned aspect ratio test process is used for calculating the aspect ratio value of the texture color feature region, and when the aspect ratio value of the texture color feature region is lower than the aspect ratio threshold value, the depth value designated to the texture color feature region is equal to the depth value designated to another texture color feature region that is perpendicularly neighboring to the former.

In another aspect of the present invention, the aforementioned overlapping rate algorithm process for the region of interest is used in calculating a overlapping rate for between a texture color feature region and a region of interest (including the distribution map of region of interest of step (A) of the present invention), and all the texture color feature regions that are neighboring each other and also have overlapping operation that is higher than a overlapping operation threshold value are designated the same depth value.

Next, the previously described distribution map for region of interest is obtained from the execution of a generation process for a distribution map for region of interest. For the generation process for distribution graph for region of interest, please refer to FIG. 9A, which is a flow chart of steps during operation of generating a graph showing distribution for region of interest of the three-dimensional image content generation method according to an embodiment of the present invention:

(E1) receiving the image signal, wherein the image signal has a plurality of image pixels and a plurality of standard image pixels;

(E2) calculating the motion feature value of each of the image pixel and the standard image pixel;

(E3) categorizing the image pixel and the standard image pixel into a plurality of groups according to the motion feature value of the image pixel and the motion feature value of the standard image pixel; and (E4) capturing a group for constituting a region of interest from the plurality of groups according to a result from categorizing the standard image pixels into the plurality of groups.

Wherein, the number of standard image pixels of the group for constituting a region of interest is smaller than the number of standard image pixels of the group for not being ready yet to constitute a region of interest.

Figure 9A:
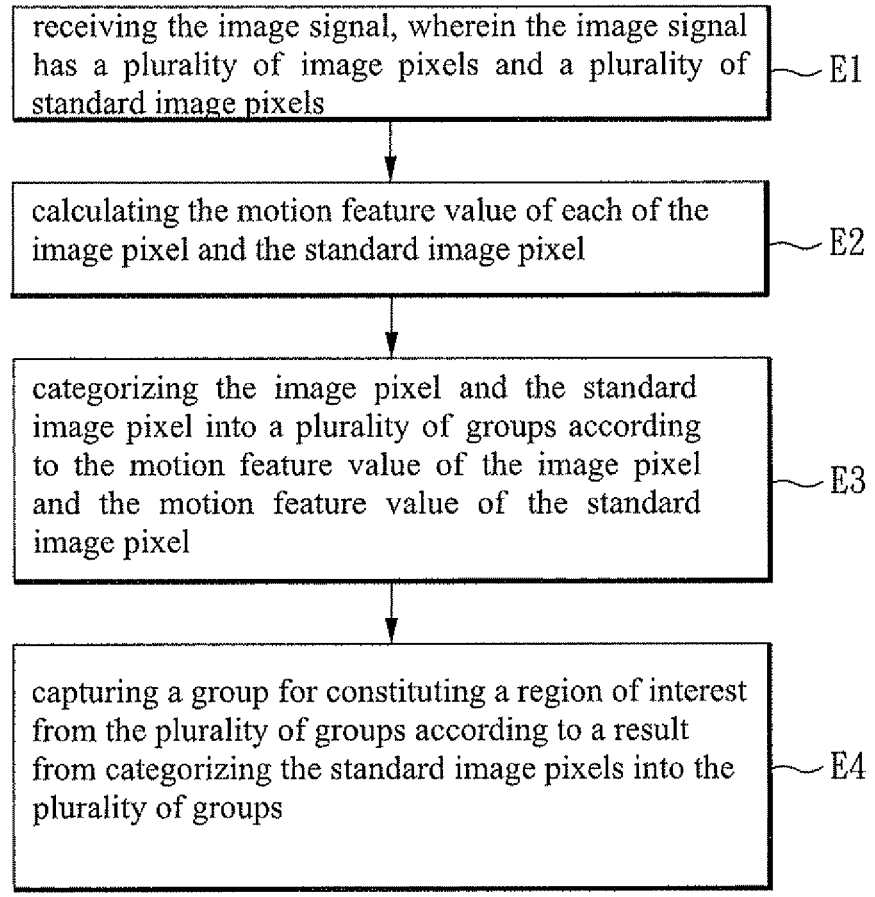
FIG. 9A illustrates a flow chart of steps during operation of generating a graph showing distribution for region of interest of the three-dimensional image content generation method according to an embodiment of the present invention.
Figure 9B:
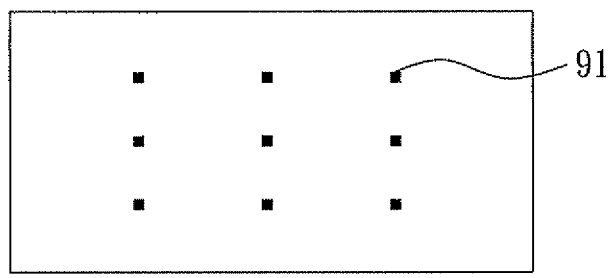
FIG. 9B is an illustrative diagram showing distribution of nine default image pixels of an image signal.

Wherein, in the present embodiment, the previously described plurality of standard image pixels 91 is 9, and they are equally distributed in an image signal, as shown in FIG. 9B.

Figure 9C:
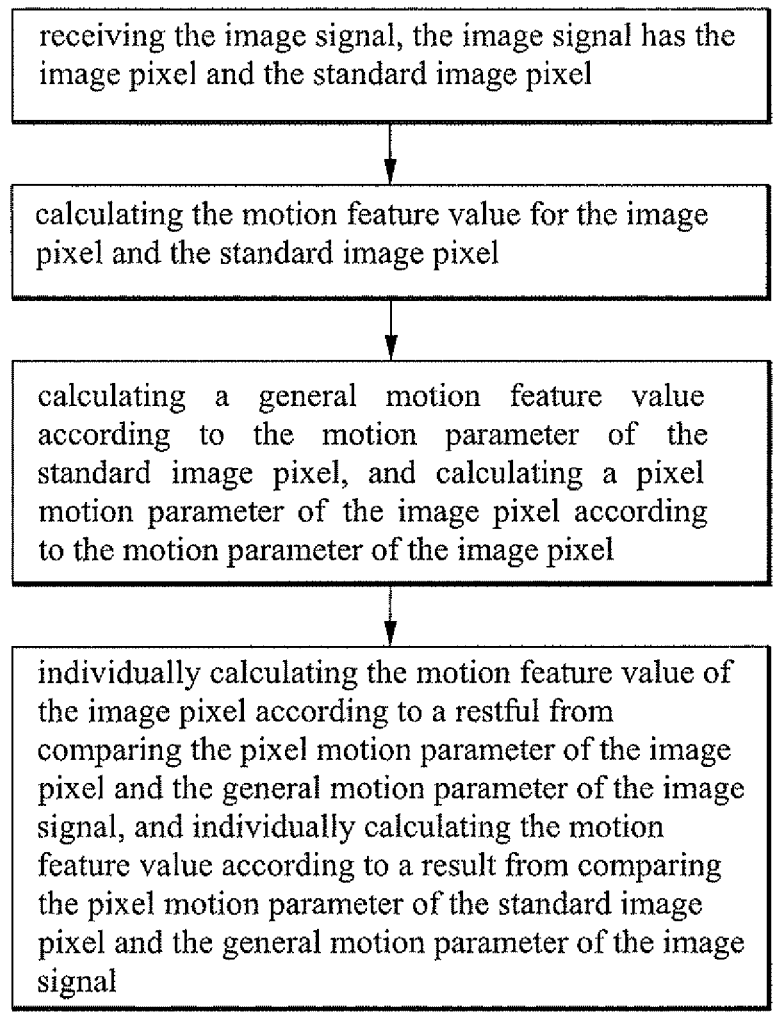
FIG. 9C shows a flow chart of steps during operation of calculating for each of a plurality of image pixels and motion feature values of a plurality of default image pixels.

In addition, as shown in FIG. 9C, the image pixel and the standard image pixel each has a motion feature value, which is calculated according to the following steps:

receiving the image signal, the image signal has the image pixel and the standard image pixel;

calculating the motion feature value for the image pixel and the standard image pixel;

calculating a general motion feature value according to the motion parameter of the standard image pixel, and calculating a pixel motion parameter of the image pixel according to the motion parameter of the image pixel; and individually calculating the motion feature value of the image pixel according to a restful from comparing the pixel motion parameter of the image pixel and the general motion parameter of the image signal, and individually calculating the motion feature value according to a result from comparing the pixel motion parameter of the standard image pixel and the general motion parameter of the image signal.

Wherein, the motion parameter of the image pixel and the standard image pixel will need to go through a procedure in which the motion parameter are compared first in terms of discrepancy of location with these image pixels (standard image pixels) in the image signal and the previous image signal in order to obtain an X axis vector $MV_x$ of a motion vector, and a Y axis vector $MV_y$ of a motion vector. The result of such which will need to go through a magnitude operation before a motion parameter is finalized.

In another perspective of the invention, after obtaining the motion parameters of the 9 standard image pixels 91, a median number operation will need to be gone through in order to capture the median number of these 9 motion parameters. Afterwards, the median number is configured to be the general motion parameter (GMP) of the image signal. Furthermore, the motion parameters of the image pixel are configured to be a pixel motion parameter (PMP).

In yet another embodiment of the present invention, the previously described step of "individually calculating the motion feature value of the image pixel according to a result from comparing the pixel motion parameter of the image pixel and the general motion parameter of the image signal" is directed to capturing the larger of between the image pixel's pixel motion parameter (PMP) and the image signal's general motion parameter (GMP) to be the motion feature value of the image pixel. Similarly, the aforementioned step of "individually calculating the motion feature value according to a result from comparing the pixel motion parameter of the standard image pixel and the general motion parameter of the image signal" is directed to capturing the larger of between the image pixel's pixel motion parameter (PMP) of the standard image pixel and the general motion parameter (GMP) of the image signal. Wherefore from the obtained image signal, all the image pixels and standard image pixels each have a "motion feature value," which is step (E2).

With reference now to FIG. 9A, when the image signal is obtained, and of which all the image pixels and the standard image pixels each has a motion feature value, each image pixel and standard image pixel is categorized into a plurality of groups according to the motion feature value of the image pixel and the motion feature value of the standard image pixel, which is step (E3). It will be more apparent to persons of relevant skills in the art now that the categorizing procedure can include K-means cluster algorithm, CRLA (constraint run length algorithm), or SBKM (symmetry distance based K-means algorithm). However in the present embodiment, the preferred algorithm is K-means algorithm.

The next immediate step will be to capture a group for constituting a region of interest according to a result from categorizing the standard image pixels into the plurality of groups, which is the result of categorizing the 9 standard image pixels into a plurality of groups. In the present embodiment, these 9 standard image pixels are categorized into 2 groups, in which one group includes a motion feature value being equal to a motion feature value of lowest threshold value of a plurality of standard image pixels, and another group includes a motion feature value being larger than the lowest threshold value of a plurality of standard image pixels. In the present embodiment, the lowest threshold for motion feature value is 4.

In the meantime, in addition to the aforesaid 9 standard image pixels, the plurality of image pixels of the image signal is also categorized into the aforesaid 2 groups, in which one group includes a motion feature value being equal to a motion feature value of lowest threshold value of a plurality of image pixels, and another group includes a motion feature value being larger than the lowest threshold value of a plurality of image pixels.

Hereafter, the following step is to capture a group having lesser number of standard image pixels to form a group of region of interest, meaning that the number of standard image pixels of the group for constituting a region of interest is smaller than the number of standard image pixels of the group for not being ready yet to constitute a region of interest.

Lastly, the captured group for constituting a region of interest includes a plurality of image pixels and a plurality of standard image pixels, which are categorized into the plurality image pixels and the plurality of standard image pixels of the group of region of interest, which are configured to be the region of interest of the image signal, which is step (E4).

Figure 9D:
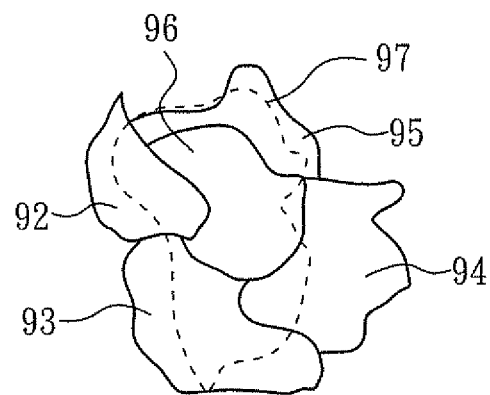
FIG. 9D is a distribution diagram for five texture color feature regions and one region of interest in a two-dimensional image signal.

Therefore, it is possible to obtain the distribution map for regions of interest produced by step (A) of the three-dimensional image content generation method of the present invention as shown in FIG. 9D. Furthermore, there are in total 5 texture color feature regions located in FIG. 9D, and they are each a first texture color feature region 92, a second texture color feature region 93, a third texture color feature region 94, a fourth texture color feature region 95 and a fifth texture color feature region 96. In addition, the range enclosed by the broken line is the region of interest 97.

The next step is to execute a overlapping operation algorithm process for the depth map generation process of a region of interest, for the three-dimensional image content generation method of an embodiment of the present invention, so as to individually calculate the overlapping operation for each texture color feature region. Putting the third texture color feature region 94 aside, the overlapping operations of the remaining 4 texture color feature regions (including the first texture color feature region 92, the second texture color feature region 93, the fourth texture color feature region 95 and the fifth texture color feature region 96) are higher than one threshold value for overlapping operation. Generally, the overlapping operation threshold value is between 50% and 80%. However, the overlapping operation threshold value for the present embodiment is 60%.

Figure 9E:
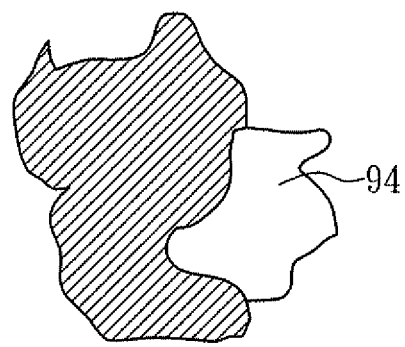
FIG. 9E is an illustrative diagram exhibiting the result of designating equal depth values among four texture color feature regions according to the five texture color feature regions of FIG. 9D.

Therefore, as shown in FIG. 9E, since the previously said 4 texture color feature regions (which is the shadow-covered region) neighbor each other and each has a overlapping operation higher than a overlapping operation threshold value, these texture color feature regions are thereby designated identical depth value.

To further illustrate, the so-called region of interest (ROI) is directed to the whole two-dimensional image signal, especially the portion that requires extra attention, including the portion of texture color feature region corresponding to a moving object. In addition to this, the aspect ratio test process is used in calculating aspect ratio value for each texture color feature region, and the overlapping percentage As such, the aspect ratio value and the overlapping percentage for each texture color feature region will have been calculated. Then according to the aspect ratio value and aspect ratio threshold value of each texture color feature region, and the overlapping percentage and overlapping percentage threshold, a depth value is designated to each texture color feature region. A depth map corresponding to the image signal can thereby be produced.

Figure 10A:
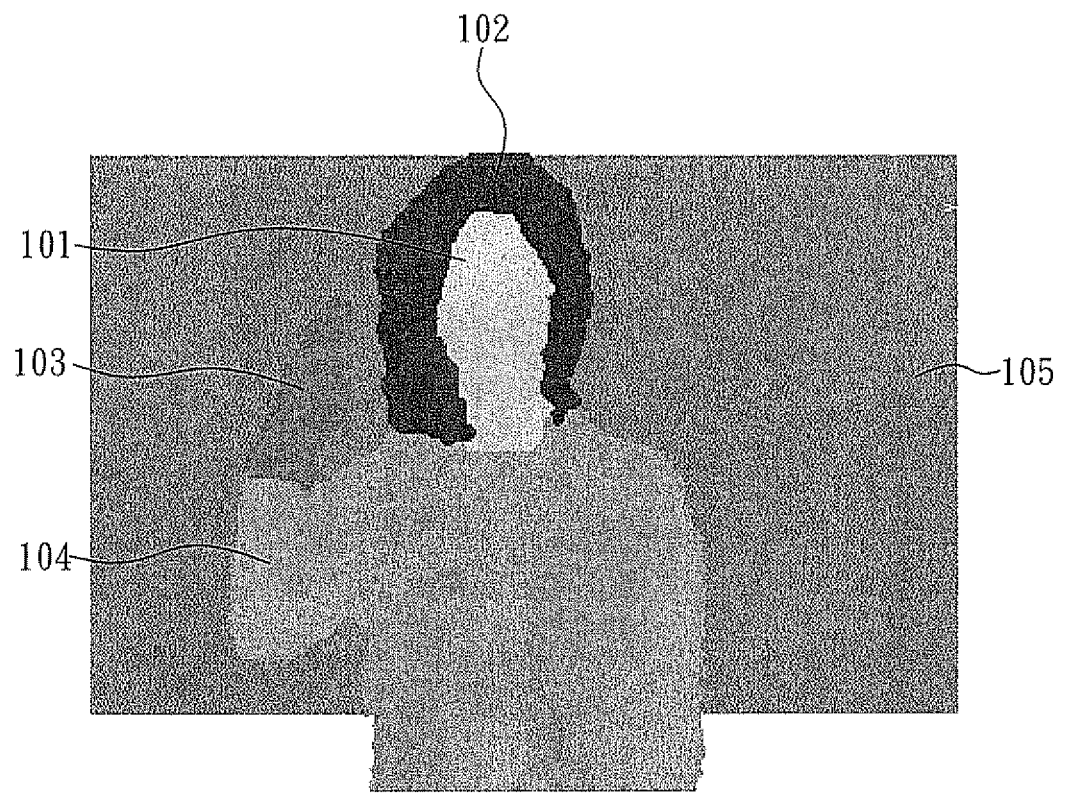
FIG. 10A is a diagram showing distribution of a plurality of texture color feature regions of an image region.

Heretofore, an example will be given for illustrative purpose, for detailing the operation of a depth graph generation method of an embodiment of the present invention:

First, referring now to FIG. 10A, which includes an image region distribution map for a plurality of texture color feature regions. Wherein, the image region distribution map includes 5 texture color feature regions, each corresponds to the first texture color feature region 101 of a user's head, the second texture color feature region 102 of a user's head, the third texture color feature region 103 of a user's head, the fourth texture color feature region 104 of a user's head, and a fifth texture color feature region for the background.

Figure 10B:
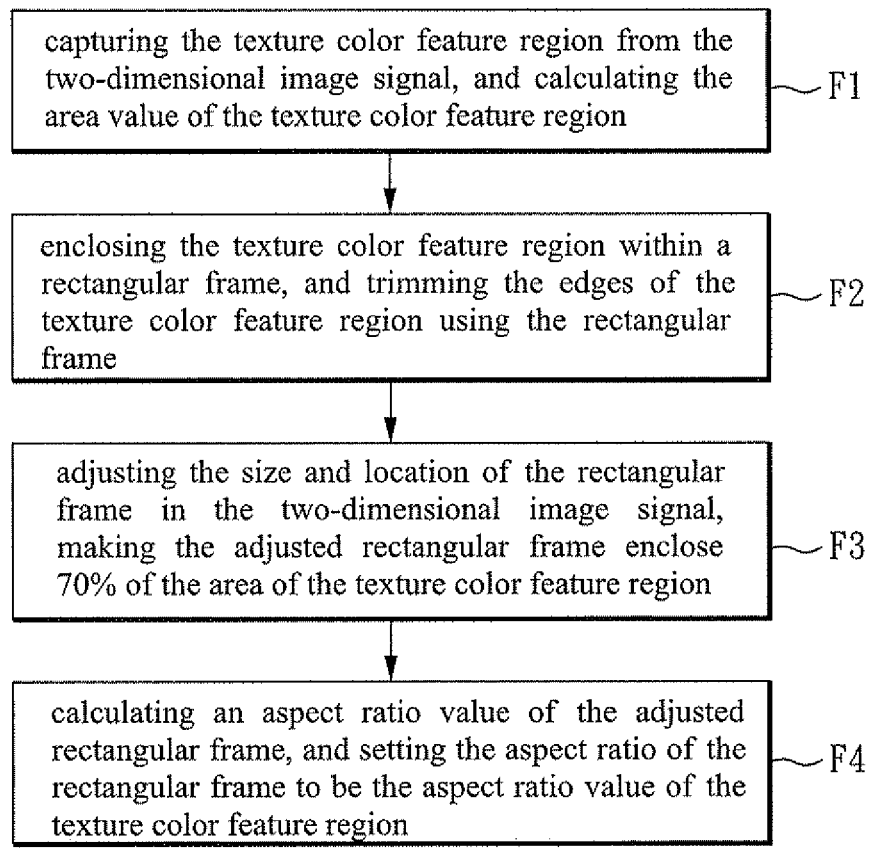
FIG. 10B is a flow chart of steps during operation of an aspect ratio value capture procedure required for a depth map generation process of the three-dimensional image content generation method according to an embodiment of the present invention.

Next, as illustrated by step (D2) of the depth map generation graph of FIG. 8, an aspect ratio test process and an overlapping percentage algorithm process are performed on the 5 texture color feature regions. In the present embodiment, the aforementioned aspect ratio test process points to executing an aspect ratio capture method for a texture color feature region. As shown in FIG. 10B, the aspect ratio capture method includes the following steps:

capturing the texture color feature region from the two-dimensional image signal, and calculating the area value of the texture color feature region;

enclosing the texture color feature region within a rectangular frame, and trimming the edges of the texture color feature region using the rectangular frame;

adjusting the size and location of the rectangular frame in the two-dimensional image signal, making the adjusted rectangular frame enclose 70% of the area of the texture color feature region; and calculating an aspect ratio value of the adjusted rectangular frame, and setting the aspect ratio of the rectangular frame to be the aspect ratio value of the texture color feature region.

Figure 10C:
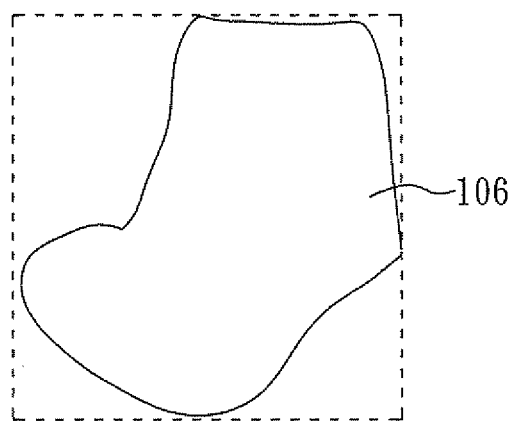
FIG. 10C is a diagram demonstrating a rectangular frame enclosing a portion of the texture color feature region, and cropping the edges of the texture color feature region.
Figure 10D:
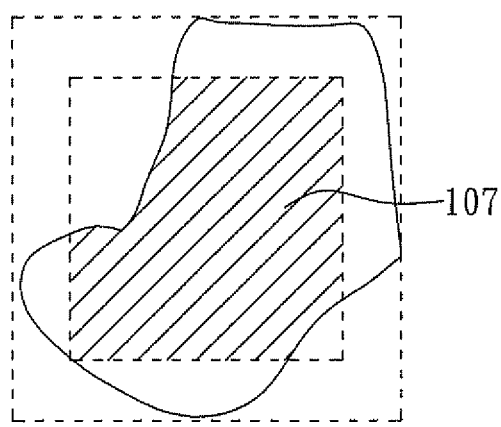
FIG. 10D is a diagram showing an adjusted rectangular frame enclosing a 70% area of the texture color feature region as presented after the size and position of the rectangular frame onto a two-dimensional image signal is adjusted.

Wherein, as shown in FIG. 10C, it is demonstrated that a rectangular frame encloses within it the texture color feature region 106, and making the rectangular frame and the edge of the texture color feature region 106 fit squarely. The next step is to adjust the size and location of the rectangular frame in the two-dimensional image signal, making the adjusted rectangular frame enclose 70% of the area of the texture color feature region, as shown in FIG. 10D.

In this example, it is first to execute the aforesaid aspect ratio capture method on the first texture color feature region 101 (corresponding to a user's head) so as to obtain the aspect ratio of the first texture color feature region 101, which is 0.45 (45/99). Then, the aspect ratio value is compared with the aspect ratio threshold value. In the present embodiment, the aspect ratio threshold value is between 1.1 and 1.3, where 1.1765 or 1.25 is preferred.

As having been described, because the aspect ratio value (0.45) of the first texture color feature region 101 is lower than the aforesaid aspect ratio threshold value, the depth value designated to the first texture color feature region 101 is identical to another texture color feature region neighboring and perpendicular to the former. As to the purpose of executing aforesaid aspect ratio test process, it is believed to determine whether the texture color feature region corresponds to a standing object, for example a human or a tree. If some texture color feature regions execute aforesaid aspect ratio test process, and it is found that it corresponds to a standing object, for example as aforementioned the first texture color feature region 101 of a user's head, the second texture color feature region 102 of a user's hair, the third texture color feature region 103 of a user's fingers and the fourth color feature region 104 of a user's body all have been determined to correspond to a human user, these texture color feature regions can then be reasonably designated equivalent depth value (with respect to the background behind the user, the depth value of the texture color feature region belonging to the same user can be considered to be entirely equivalent).

Heretofore, the description will be presented under situations using different values, the depth map generation process of the three-dimensional image content generation method of an embodiment of the present invention discloses how to designate a depth value to a texture color feature region.

First, when the aspect ratio value of the texture color feature region is lower than the aspect ratio threshold value, or when the overlapping percentage of the texture color feature region is higher than the overlapping percentage threshold value, the depth value designated to the texture color feature region can be calculated by the following formula:

$$D = 1 - \frac{VLP}{h} \qquad \text{(Formula 13)}$$

Figure 11A:
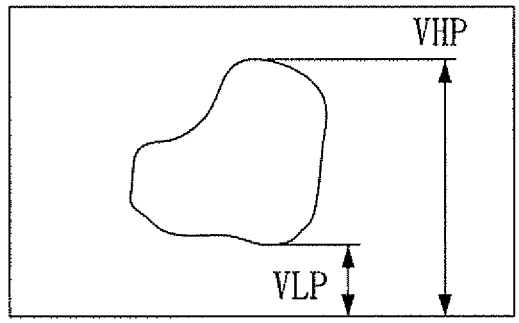
FIG. 11A is a diagram displaying designation of an identical depth value for a plurality of image pixels.

Wherein, VLP is the location of the lowest image pixel in the two-dimensional image signal between the texture color feature region, another texture color feature region perpendicular and neighboring the texture color feature region, and a plurality of texture color feature regions neighboring the texture color feature region. h is a height value of the two-dimensional image signal. FIG. 11A shows a distribution map for the texture color feature regions in the two-dimensional image signal.

As described previously, because the aspect ratio value of the texture color feature region is lower than the aspect ratio threshold value, or the overlapping percentage of the texture color feature region is higher than the overlapping percentage threshold value, the depth values of the texture color feature region, another texture color feature region perpendicular and neighboring the texture color feature region, and a plurality of texture color feature regions neighboring the texture color feature region are all of a value represented by D.

Furthermore, when the aspect ratio value of the texture color feature region is lower than the aspect ratio threshold value, and the overlapping percentage of the texture color feature region is not higher than the overlapping percentage threshold value, the depth value D designated to the texture color feature region can be determined by the following formula:

$$D = D_{min} + \frac{(D_{max} - D_{min}) \times (VCP - VLP)}{(VHP - VLP)} \qquad \text{(Formula 14)}$$

Wherein, VHP is the location of the highest image pixel in the two-dimensional image signal between the texture color feature region, another texture color feature region perpendicular and neighboring the texture color feature region, and a plurality of texture color feature regions neighboring the texture color feature region; VLP is the location of the lowest image pixel in the two-dimensional image signal between the texture color feature region, another texture color feature region perpendicular and neighboring the texture color feature region, and a plurality of texture color feature regions neighboring the texture color feature region; VCP is the location of an image pixel to be assigned a depth value in the two-dimensional image signal between the texture color feature region, another texture color feature region perpendicular and neighboring the texture color feature region, and a plurality of texture color feature regions neighboring the texture color feature region; h is the height value of the two-dimensional image signal, $D_{min}$ is the smallest depth value, the value of which is $$1 - \frac{VLP}{h},$$

$D_{max}$ is the largest depth value, the value which is $$1 - \frac{VHP}{h}.$$

Figure 11B:
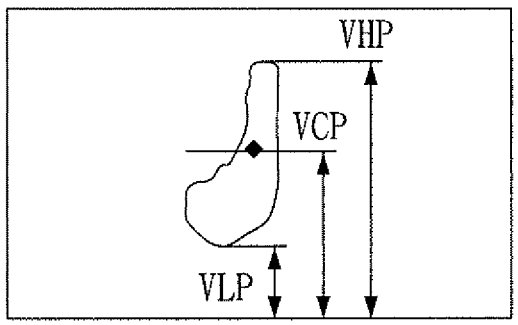
FIG. 11B is a diagram displaying designation of a linear distribution of depth values for a plurality of image pixels.

FIG. 11B demonstrates the distribution state of the texture color feature regions in the two-dimensional image signal.

Figure 11C:
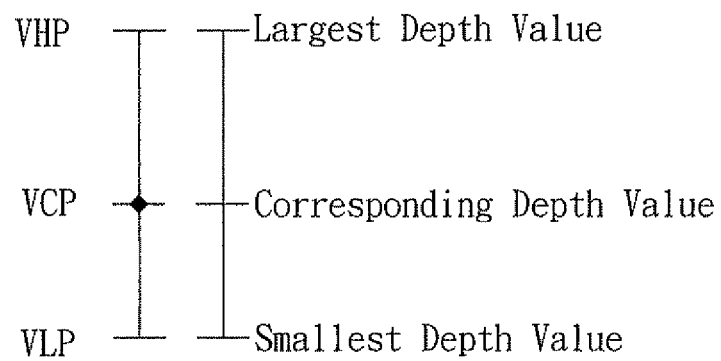
FIG. 11C shows a chart exhibiting the linear relationship corresponding to a depth value for use in attributing a pending depth value to an image pixel.

As will be understood from Formula 14, in the present embodiment, the depth value of an image pixel of which the depth value is to be determined later in a texture color feature region, corresponds to an image pixel by a linear relationship in the two-dimensional image signal. Such relationship is demonstrated in FIG. 11C. However, in some applications, the aforementioned linear relationship can also work to alter other types of relationship, such as second order or third order relationship.

Figure 12:
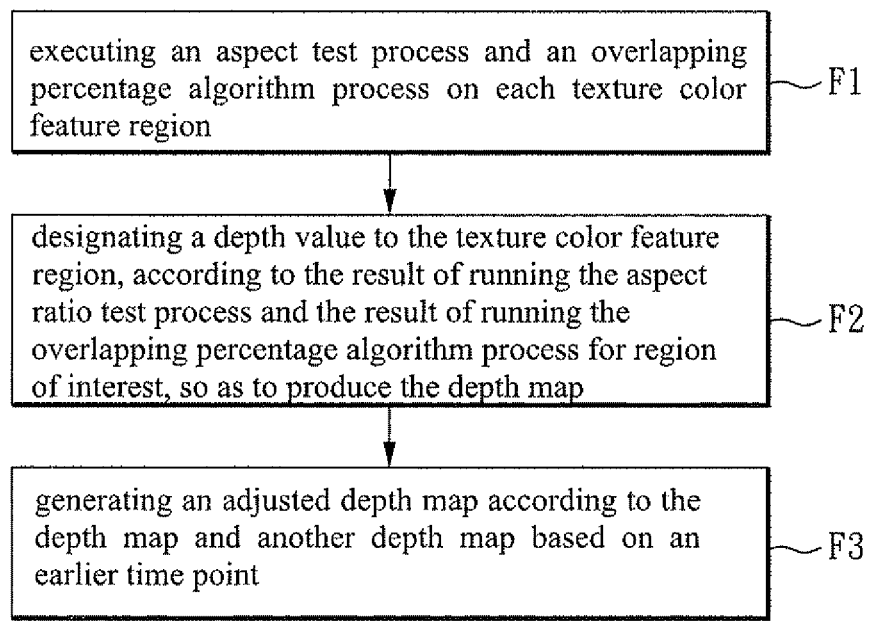
FIG. 12 is another embodiment for a flow chart of steps during operation of depth map generation process for an adjusted depth map operable to produce a corresponding image signal.

Other than this, the aforementioned depth map generation method can also produce an adjusted depth map corresponding to an image signal. Wherein, as shown in FIG. 12, the depth map generation method includes the following steps:

(F1) executing an aspect test process and an overlapping percentage algorithm process on each texture color feature region;

(F2) designating a depth value to the texture color feature region, according to the result of running the aspect ratio test process and the result of running the overlapping percentage algorithm process for region of interest, so as to produce the depth map; and (F3) generating an adjusted depth map according to the depth map and another depth map based on an earlier time point.

Since the aforementioned steps (F1) and (F2) are identical to the steps (D1) and (D2) of the depth map generation method of FIG. 8, the detailed operation process of steps (F1) and (F2) and any possible types will not be further elaborated here.

Figure 13A:
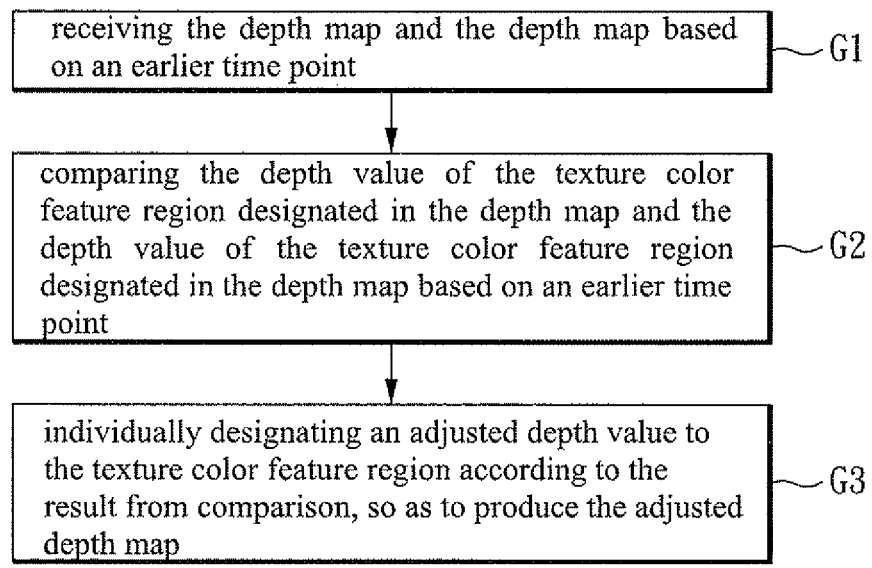
FIG. 13A shows a chart of sub-steps for the step F3 of the depth map generation process according to an embodiment of FIG. 12.

The detailed operation process of step (F3) will, however, be provided below:

As shown in FIG. 13A, which shows a flow chart of sub-steps of step (F3), which comprises:

(G1) receiving the depth map and the depth map based on an earlier time point;

(G2) comparing the depth value of the texture color feature region designated in the depth map and the depth value of the texture color feature region designated in the depth map based on an earlier time point; and (G3) individually designating an adjusted depth value to the texture color feature region according to the result from comparison, so as to produce the adjusted depth map.

In addition, the depth map based on an earlier time point works according to a depth map operation formula based on an earlier time point, according to a forward motion vector and a backward motion vector, and from the depth map the result is calculated. Wherein, the depth map operation formula based on an earlier time point is:

$$DVT(x,y,t) = DVT(x',y',t-1) \qquad \text{(Formula 15)}$$

wherein, $$x' = x - \frac{(FW\_MV_x - BW\_MV_x)}{2}$$ (Formula 16)

$$y' = y - \frac{(FW\_MV_y - BW\_MV_y)}{2}$$ (Formula 17)

Figure 13B:
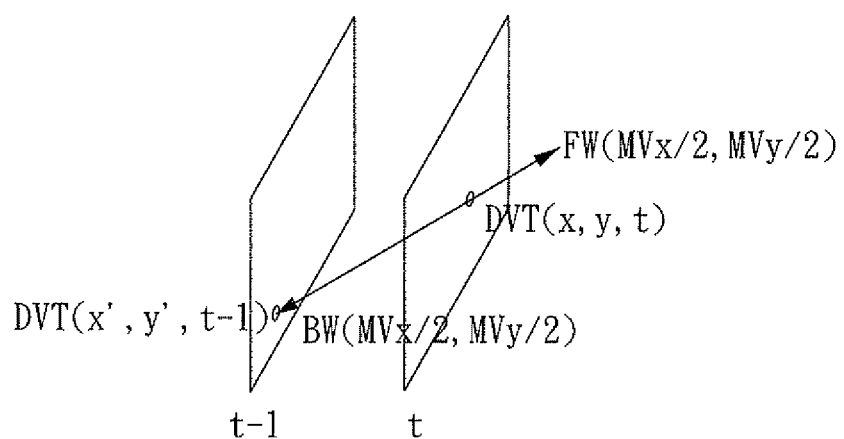
FIG. 13B is a diagram showing the relationship between each of the parameters used in generating an anterior depth map based on a forward motion vector and a backward motion vector.

And for Formula 15, Formula 16, Formula 17, DVT(x,y,t) is the location of the texture color feature region in the depth map in the two-dimensional image signal. DVT (x',y',t−1) is the location of the texture color feature region in a depth map based on an earlier time point, $FW\_MV_x$ is an x-axis vector of a forward motion vector, $FW\_MV_y$ is a y-axis vector of the forward motion vector, $BW\_MV_x$ is an x-axis vector of a backward motion vector, $BW\_MV_y$ is a y-axis vector of the backward motion vector. Other than this, the relationship of each parameters of the aforementioned Formula 15, Formula 16, Formula 17 can be observed in FIG. 13B.

Through the use of a depth map generation process shown in FIG. 12 in the depth map generation process of the three-dimensional image content generation method of an embodiment of the present invention, the depth map designated to the texture color feature region in the depth map and the depth map based on an earlier time point, designated to the texture color feature region will be compared against each other.

Finally, taking the compared result for consideration, individually designating a depth value to each texture color feature region. As such, an adjusted depth map will be produced. As such, an adjusted depth map will be produced. Also, depending on a predetermined setting in the aforementioned depth map generation method, individually designating an adjusted depth value to each texture color feature region according to a depth value of a texture color feature region in the depth map, and a depth value of a texture color feature region in the depth map based on an earlier time point.

Firstly, for the first situation: (1) when the difference between a depth value (DVT) designated to a texture color feature region in a depth map based on an earlier time point and a depth value (DVS) designated to the same texture color feature region in a depth map is lower than an adjusted threshold value (ΔE), (which is DVT−DVS<ΔE); and (2) when the depth value (DVT) designated to a texture color feature region in a depth map based on an earlier time point is lower than the result of 1 subtracting the adjusted threshold value (ΔE), (which is DVT<1−ΔE), the depth value D designated to the texture color feature region in the adjusted depth map is to be set as:

The depth value (DVT) designated to the texture color feature region in the depth map based on an earlier time point, plus the adjusted threshold value (ΔE), which is represented by D=DVT+ΔE.

Secondly, for the second situation: (1) when the difference between a depth value (DVT) designated to a texture color feature region in a depth map based on an earlier time point and a depth value (DVS) designated to the same texture color feature region in a depth map is higher than an adjusted threshold value (ΔE), (which is DVT−DVS>ΔE); and (2) when the depth value (DVT) designated to a texture color feature region in a depth map based on an earlier time point is higher than the adjusted threshold value (ΔE), (which is DVT>ΔE), the depth value D designated to the texture color feature region in the adjusted depth map is to be set as:

The depth value (DVT) designated to the texture color feature region in the depth map based on an earlier time point, minus the adjusted threshold value (ΔE), which is represented by D=DVT−ΔE.

Figure 14:
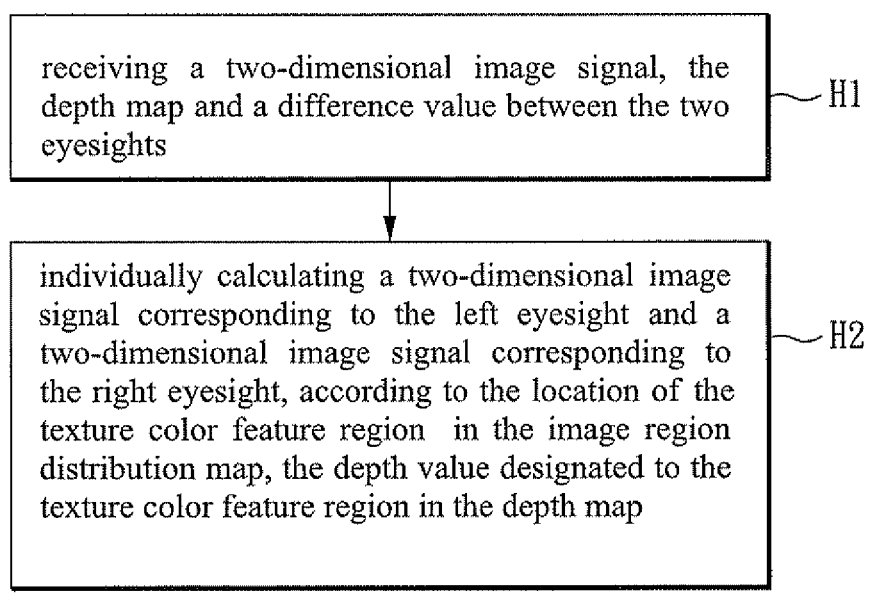
FIG. 14 illustrates a flow chart of steps during operation of the three-dimensional image formulation process of the three-dimensional image content generation method according to an embodiment of the present invention.

Finally, when the above two situations do not happen, the depth value D designated to the texture color feature region in the adjusted depth map. is:

The depth value (DVT) designated to the texture color feature region in the depth map based on an earlier time point, which is represented by D=DVT Referring now to FIG. 14, the three-dimensional image generation process of the three-dimensional image content generation method of the present invention includes the following steps:

(H1) receiving a two-dimensional image signal, the depth map and a difference value between the two eyesights; and (H2) individually calculating a two-dimensional image signal corresponding to the left eyesight and a two-dimensional image signal corresponding to the right eyesight, according to the location of the texture color feature region in the image region distribution map, the depth value designated to the texture color feature region in the depth map.

And the next step involves individually calculating a two-dimensional image signal corresponding to the left eyesight and a two-dimensional image signal corresponding to the right eyesight according to the difference value between the two eyesights of a viewer. The algorithm for the above purpose is commonly known to persons of ordinary skills in the art, therefore elaboration for such art will not be provided here.

Lastly, when the aforementioned three-dimensional image generation process has produced a plurality of three-dimensional image signal, a frame rate will be used to individually chain the plurality of three-dimensional image signals responsive to different time point together to form a three-dimensional image signal (three-dimensional image steam). Wherein, the aforementioned frame rate is directed to the number of image signals played per second, and the value of which has been confirmed before being executed by the aforementioned image signal chaining process. Generally speaking, a video signal has a plurality of image signals, but in some specific applications, this arrangement can also include a video signal.

Furthermore, for general applications, frame rate of 24 (which means playing 24 image signals per second) is sufficient for numerous application situations, for example such may be used to display an object moving at a regular speed inside a screen monitor. However, for some specific applications, for example for displaying high speed racing car, the frame rate of a video signal should at least be 30, or above 40, in order to clearly display the graphical details of a high speed racing car. In another perspective, because the technology using a frame rate to chain together a plurality of image signals (for example three-dimensional image signals) to form a video signal (for example three-dimensional video signal) is widely known to persons of skills in the art, further elaboration will not be provided here.

Therefore, the three-dimensional image content generation method of the present invention is understood to be capable of receiving a two-dimensional image signal and directing the two-dimensional image signal to undergo a proper calculation algorithm to therefore transform the two-dimensional image signal into a three-dimensional image signal.

The foregoing describes the invention including preferred forms thereof. Alterations and modifications as will be obvious to those skilled in the art are intended to be incorporated within the scope of the invention as defined in the accompanying claims.

What is claimed is:

1. A three-dimensional video content generation method implemented by a computer, for generating a three-dimensional video signal, comprising:
   (A) the computer receiving a two-dimensional image and generating a region of interest distribution map from the 2D image;
   (B) the computer executing a color feature capture process, for forming a plural of color feature regions;
   (C) the computer executing an image segmentation process basing on the texture feature of the plural of color feature regions, for forming an image region distribution map;
   (D) the computer executing a depth map generation process, for generating a depth map basing on the region of interest distribution map and the image region distribution map;
   (E) the computer executing a three-dimensional image generation process, for forming the three-dimensional image basing on the image region distribution map and the depth map; and
   (F) the computer chaining a plurality of the three-dimensional images to form the three-dimensional video basing on a frame rate.

2. The three-dimensional video content generation method according to claim 1, wherein in step (B) the color feature capture process comprises the following:
   receiving the two-dimensional image signal;
   mapping the image signal to a color space model, enabling the color contained by each of the plurality of image pixels to be respectively mapped to a corresponding point in the color space model, the corresponding point having a coordinate represented by a first parameter, a second parameter, and a third parameter, the color space model including a color plane composed of a plurality of color regions and a plurality of fuzzy regions;
   comparing the third parameter with an adjustment threshold value to work out a comparison result, and obtaining an adjusted second parameter based on the comparison result and the second parameter;
   sequentially clustering each of the color provided by the plurality of image pixels into one of the plurality of color regions or one of the plural fuzzy regions of the color plane according to the first parameter and the adjusted second parameter;
   designating a color feature vector to each of the plurality of image pixels according to a result of clustering;
   applying a clustering algorithm, and clustering the image pixels into a plurality of color clusters based on the color feature vector designated respectively to each of the image pixel; and
   encircling in an identical color feature region the image pixels that border each other and belong in same color group, so as to form a color feature region.

3. The three-dimensional video content generation method according to claim 2, wherein the color space model is a HSI color space model, and a first parameter is a hue component, a second parameter is a saturation component, and a third parameter is an intensity component.

4. The three-dimensional video content generation method according to claim 3, wherein the adjusted threshold value is between 70 and 90, and when the intensity component is higher than the adjusted threshold value, the following formula will be used to calculate the adjusted saturation component:

$$S'=a+b*S;$$

wherein S' is an adjusted saturation component, S is a saturation component, a and b are each a random positive number, and satisfy the a+b=1 condition;
when the intensity value is not higher than the adjusted threshold value, the following formula for calculating adjusted saturation component will be used:

$$S' = (a + b*S) * \left(\frac{I}{T}\right);$$

wherein S' is an adjusted saturation value, S is saturation value, T is the adjusted threshold value, a and b is each a random positive number, and satisfy the a+b=1 condition.

5. The three-dimensional video content generation method according to claim 3, wherein the color regions include a first color region, a second color region, a third color region, a fourth color region and a fifth color region, wherein each color region individually responds to a particular color, and a color region that is not covered by any of above color region is a fuzzy region.

6. The three-dimensional video content generation method according to claim 5, wherein the first color region corresponds to a red region, the second color region corresponds to a green region, the third color segment corresponds to a cyan region, the fourth color region corresponds to a blue region, and the fifth color segment corresponds to a magenta region.

7. The three-dimensional video content generation method according to claim 6, wherein when the color of the image pixel is classified into one of the five color regions, the color feature vectors designated to the image pixel include a first vector, a second vector, a third vector, a fourth vector, a fifth vector, and a sixth vector, and the first vector, the second vector, the third vector, the fourth vector, and the fifth vector each corresponds to the color region, the value of the sixth vector is the value of the sixth component is equal to 1 subtracting adjusted saturation value; a sum of the value of the first vector, the value of the second vector, the value of the third vector, the value of the fourth vector, the value of the fifth vector, and the value of the sixth vector is equal to 1.

8. The three-dimensional video content generation method according to claim 6, wherein when the color of the image pixel is classified into one of the five color regions, the color feature vectors designated to the image pixel include a first vector, a second vector, a third vector, a fourth vector, a fifth vector, and a sixth vector, and the first vector and the second vector each corresponds to color regions on two sides of a fuzzy region of which colors of the image pixel are categorized to, and the first vector, the second vector, the third vector, the fourth vector, and the fifth vector each corresponds to the color region, a value of the sixth vector is equal to 1 subtracting the adjusted saturation component; a sum of a value of the first vector, a value of the second vector, a value of the third vector, a value of the fourth vector, a value of the fifth vector, and the value of the sixth vector is equal to 1.

9. The three-dimensional video content generation method according to claim 8, wherein the value of the first vector is determined by the following formula:

$$C=S'*Belongingness;$$

wherein C is the value of the first vector, S' is the adjusted saturation component, Belongingness is a degree of belongingness, and the degree of belongingness may be determined by:

$$\text{Belongingness} = \frac{U-H}{U-L}$$

where U is an angle contained by a distant border of a color region on the color plane, to which the second vector corresponds, L is an angle contained between a neighboring border of a color region on the color plane, to which the second vector corresponds, H is an angle contained between the hue component and the color plane.

10. The three-dimensional video content generation method according to claim 1, wherein step (C) for an image segmentation process using texture feature of the three-dimensional image content generation method comprises:
   receiving the two-dimensional image signal;
   applying a Gabor filter, executing a Gabor filtering process on each image signal, and executing further a value algorithm process on a result from the Gabor filtering process;
   designating individually a texture feature vector to the image pixel, determined based on a result of the value algorithm process;
   executing a segmentation process on the two-dimensional image pixels, based on the designated texture feature vector of the image pixel such that the two-dimensional image signal has a plurality of texture feature segments, and such that the image pixels located within the same texture feature region each has texture feature vector of identical cluster;
   individually executing a second segmentation process in accordance with distribution of the texture feature region in the two-dimensional image signal, such that at least one color feature region has a plurality of texture color feature region, and such that the image pixels located in the same texture color feature region each has texture feature vector of identical cluster and color feature vector of identical cluster; and
   forming an image region distribution map based on the texture color feature region in the two-dimensional image signal.

11. The three-dimensional video content generation method according to claim 10, wherein the Gabor filter package includes an internal subband Gabor filter and an external subband Gabor filter, and the internal subband Gabor filter and external subband Gabor filter each includes six two-dimensional Gabor filters, meaning that each of the internal subband Gabor filter and the external subband Gabor filter has an identical number of two-dimensional Gabor filters.

12. The three-dimensional video content generation method according to claim 11, wherein the twelve two-dimensional Gabor filters can each be described by the following formula:

$$g(x, y; \sigma_x, \sigma_y, \omega, \theta) = \frac{1}{2\pi\sigma_x\sigma_y} e^{-\frac{1}{2}\left(\left(\frac{x'}{\sigma_x}\right)^2 + \left(\frac{y'}{\sigma_y}\right)^2\right)} e^{j\omega x'};$$

where $\sigma_x$, $\sigma_y$ each is a Gaussian kernel standard deviation, $\omega$ is a Fourier fundamental frequency, $\theta$ is a direction of the two-dimensional Gabor filter. Also, the relationship between x', y', x, y satisfy the following formulas:

$$x' = x \cos\theta\, y \sin\theta +$$

$$y' = x + \sin\theta\, y \cos\theta.$$

13. The three-dimensional video content generation method according to claim 11, wherein the standard deviations for the six two-dimensional Gabor filters of the internal subband Gabor filter, $\sigma_x$, $\sigma_y$ are preferred to be configured at between 1.75 and 6.5, and the standard deviations for the six two-dimensional Gabor filters of the internal subband Gabor filter, $\sigma_x$, $\sigma_y$ are preferred to be configured at between 1.75 and 4.5.

14. The three-dimensional video content generation method according to claim 10, wherein step (C) for an image segmentation process using texture feature of the three-dimensional image content generation method comprises further comprises an image region combination process subject to actual requirement, such that a plurality of texture color feature region is combined into a combined image texture color feature region, comprising:
   capturing an area value and a perimeter value of each texture color feature region so as to determine a closeness value of each texture color feature region;
   according to a closeness value for each texture color feature region, arranging the texture color feature regions from a texture color feature region having highest area value to a texture color feature region having lowest area value;
   according to an order arranged from the texture color feature region having highest area value to the texture color feature region having lowest area value, executing a combination test process on each texture color feature region so as to form a transitory combined image texture color feature region, the transitory combined image texture color feature region includes the texture color feature region and a neighboring texture color feature region, and capturing an area value and a perimeter value of the transitory combined image texture color feature region so as to determine a closeness value of the transitory combined image texture color feature region; and
   comparing the closeness value of the transitory combined image texture color feature region and the closeness value of one of the texture color feature region, and when the closeness value of the transitory combined image texture color feature region is higher than the closeness value of one of the texture color feature region, setting the transitory combined image texture color feature region as a combined image texture color feature region.

15. The three-dimensional video content generation method according to claim 14, wherein the closeness value of a plurality of texture color feature region can be determined using the following formula:

$$C = \frac{A}{P^2};$$

where C is closeness value, A is area value, P is perimeter value.

16. The three-dimensional video content generation method according to claim 14, wherein the area value and closeness value of each of the texture color feature region are compared respectively with an area threshold value and a closeness threshold value before a threshold value identification process is executed, the combination test process is executed when the area value of texture color feature region resulting from the comparison is lower than the aforementioned area threshold value, and when the closeness value of the texture color feature region is lower than the closeness value of the aforementioned threshold value; the area threshold value is between 120 to 240, and the closeness threshold value is between 0.001 to 0.008.

17. The three-dimensional video content generation method according to claim 1, wherein the step (D) comprises:
(D1) executing an aspect ratio test process on each texture color feature region and an overlapping rate algorithm process on a region of interest; and
(D2) individually designating a depth value to the texture color feature region according to the result of the aspect ratio test process and the result of the overlapping rate algorithm process;
wherein, the aforementioned aspect ratio test process is used for calculating the aspect ratio value of the texture color feature region, and when the aspect ratio value of the texture color feature region is lower than the aspect ratio threshold value, the depth value designated to the texture color feature region is equal to the depth value designated to another texture color feature region that is perpendicularly neighboring to the former.

18. The three-dimensional video content generation method according to claim 1, wherein the distribution map for region of interest is obtained from the execution of a generation process for a distribution map for region of interest, the generation process for a distribution map for region of interest comprises:
receiving the image signal, wherein the image signal has a plurality of image pixels and a plurality of standard image pixels;
calculating the motion feature value of each of the image pixel and the standard image pixel;
categorizing the image pixel and the standard image pixel into a plurality of groups according to the motion feature value of the image pixel and the motion feature value of the standard image pixel; and
capturing a group for constituting a region of interest from the plurality of groups according to a result from categorizing the standard image pixels into the plurality of groups;
wherein, the number of standard image pixels of the group for constituting a region of interest is smaller than the number of standard image pixels of the group for not being ready yet to constitute a region of interest.

19. The three-dimensional video content generation method according to claim 18, wherein the image pixel and the standard image pixel each has a motion feature value,
receiving the image signal, the image signal has the image pixel and the standard image pixel;
calculating the motion feature value for the image pixel and the standard image pixel;
calculating a general motion feature value according to the motion parameter of the standard image pixel, and calculating a pixel motion parameter of the image pixel according to the motion parameter of the image pixel; and
individually calculating the motion feature value of the image pixel according to a result from comparing the pixel motion parameter of the image pixel and the general motion parameter of the image signal.

20. The three-dimensional video content generation method according to claim 17, wherein the aspect ratio test process comprises:
capturing the texture color feature region from the two-dimensional image signal, and calculating the area value of the texture color feature region;
enclosing the texture color feature region within a rectangular frame, and trimming the edges of the texture color feature region using the rectangular frame;
adjusting the size and location of the rectangular frame in the two-dimensional image signal, making the adjusted rectangular frame enclose 70% of the area of the texture color feature region; and
calculating an aspect ratio value of the adjusted rectangular frame, and setting the aspect ratio of the rectangular frame to be the aspect ratio value of the texture color feature region.

21. The three-dimensional video content generation method according to claim 17, wherein when the aspect ratio value of the texture color feature region is lower than the aspect ratio threshold value, or when the overlapping percentage of the texture color feature region is higher than the overlapping percentage threshold value, the depth value designated to the texture color feature region can be calculated by the following formula:

$$D = 1 - \frac{VLP}{h}$$

where VLP is the location of the lowest image pixel in the two-dimensional image signal between the texture color feature region, another texture color feature region perpendicular and neighboring the texture color feature region, and a plurality of texture color feature regions neighboring the texture color feature region h is a height value of the two-dimensional image signal.

22. The three-dimensional video content generation method according to claim 17, when the aspect ratio value of the texture color feature region is lower than the aspect ratio threshold value, and the overlapping percentage of the texture color feature region is not higher than the overlapping percentage threshold value, the depth value D designated to the texture color feature region can be determined by the following formula:

$$D = D_{min} + \frac{(D_{max} - D_{min}) \times (VCP - VLP)}{(VHP - VLP)}$$

where VHP is the location of the highest image pixel in the two-dimensional image signal between the texture color feature region, another texture color feature region perpendicular and neighboring the texture color feature region, and a plurality of texture color feature regions neighboring the texture color feature region; VLP is the location of the lowest image pixel in the two-dimensional image signal between the texture color feature region, another texture color feature region perpendicular and neighboring the texture color feature region, and a plurality of texture color feature regions neighboring the texture color feature region; VCP is the location of an image pixel to be assigned a depth value in the two-dimensional image signal between the texture color feature region, another texture color feature region perpendicular and neighboring the texture color feature region, and a plurality of texture color feature regions neighboring the texture color feature region; h is the height value of the two-dimensional image signal, $D_{min}$ is the smallest depth value, the value of which is $$1 - \frac{VLP}{h},$$

$D_{max}$ is the largest depth value, the value which is $$1 - \frac{VHP}{h}.$$

23. The three-dimensional video content generation method according to claim 17, wherein the aspect ratio threshold value is between 1.1 and 1.3, the overlapping percentage is a ratio of the area value of the texture color feature region divided by the area value of the region of interest, and the overlapping percentage threshold value is between 50% and 80%.

24. The three-dimensional video content generation method according to claim 1, wherein sub-steps of step (F3), the depth map of which turns to an adjusted depth map based on itself and a depth map based on an earlier time point, comprises:
receiving the depth map and the depth map based on an earlier time point;
comparing the depth value of the texture color feature region designated in the depth map and the depth value of the texture color feature region designated in the depth map based on an earlier time point; and
(G3) individually designating an adjusted depth value to the texture color feature region according to the result from comparison, so as to produce the adjusted depth map.

25. The three-dimensional video content generation method according to claim 24, the depth map based on an earlier time point works according to a depth map operation formula based on an earlier time point, and from the depth map the result is calculated:
wherein, the depth map operation formula based on an earlier time point is:

$$DVT(x, y, t) = DVT(x', y', t-1);$$
$$x' = x - \frac{(FW\_MV_x - BW\_MV_x)}{2});$$
$$y' = y - \frac{(FW\_MV_y - BW\_MV_y)}{2});$$

where DVT (x, y, t) is the location of the texture color feature region in the depth map in the two-dimensional image signal DVT(x', y', t−1) is the location of the texture color feature region in a depth map based on an earlier time point, $FW\_MV_x$ is an x-axis vector of a forward motion vector, $FW\_MV_y$ is a y-axis vector of the forward motion vector, $BW\_MV_x$ is an x-axis vector of a backward motion vector, $BW\_MV_y$ is a y-axis vector of the backward motion vector.

26. The three-dimensional video content generation method according to claim 24, wherein when the difference between a depth value designated to a texture color feature region in a depth map based on an earlier time point and a depth value designated to the same texture color feature region in a depth map is lower than an adjusted threshold value, and when the depth value designated to a texture color feature region in a depth map based on an earlier time point is lower than the result of 1 subtracting the adjusted threshold value, the depth value designated to the texture color feature region in the adjusted depth map is to be set as: the depth value designated to the texture color feature region in the depth map based on an earlier time point, plus the adjusted threshold value.

27. The three-dimensional video content generation method according to claim 24, wherein when the difference between a depth value designated to a texture color feature region in a depth map based on an earlier time point and a depth value designated to the same texture color feature region in a depth map is higher than an adjusted threshold value, and when the depth value designated to a texture color feature region in a depth map based on an earlier time point is higher than the adjusted threshold value, the depth value designated to the texture color feature region in the adjusted depth map is to be set as: the depth value designated to the texture color feature region in the depth map based on an earlier time point, minus the adjusted threshold value.

28. The three-dimensional video content generation method according to claim 27, wherein the depth value designated to the texture color feature region in the adjusted depth map is set as the depth value designated to the texture color feature region in the depth map based on an earlier time point.

* * * * *